United States Patent
Fanning et al.

(10) Patent No.: US 8,627,287 B2
(45) Date of Patent: Jan. 7, 2014

(54) PRIORITIZING QUALITY IMPROVEMENTS TO SOURCE CODE

(75) Inventors: Michael C Fanning, Redmond, WA (US); Nachiappan Nagappan, Redmond, WA (US); Thomas J Ball, Mercer Island, WA (US); Sean Sandys, Millbrae, CA (US)

(73) Assignee: Microsoft Corporation, Redmond, WA (US)

( * ) Notice: Subject to any disclaimer, the term of this patent is extended or adjusted under 35 U.S.C. 154(b) by 1462 days.

(21) Appl. No.: 11/947,606

(22) Filed: Nov. 29, 2007

(65) Prior Publication Data

US 2009/0144698 A1 Jun. 4, 2009

(51) Int. Cl.
G06F 9/44 (2006.01)
G06F 9/45 (2006.01)

(52) U.S. Cl.
USPC .............................. 717/124; 717/126; 717/141

(58) Field of Classification Search
None
See application file for complete search history.

(56) References Cited

U.S. PATENT DOCUMENTS

| | | | |
|---|---|---|---|
| 4,853,851 A * | 8/1989 | Horsch ..................... | 714/38.1 |
| 6,356,285 B1 * | 3/2002 | Burkwald et al. ........... | 717/141 |
| 6,895,577 B1 * | 5/2005 | Noble et al. ................ | 717/126 |
| 7,024,589 B2 | 4/2006 | Hartman et al. | |
| 7,055,130 B2 * | 5/2006 | Charisius et al. ........... | 717/126 |
| 7,093,238 B2 * | 8/2006 | Givoni et al. ............... | 717/126 |
| 7,197,427 B2 | 3/2007 | Noonan et al. | |
| 7,861,226 B1 * | 12/2010 | Episkopos et al. .......... | 717/124 |
| 7,861,229 B2 * | 12/2010 | Lammel et al. ............. | 717/141 |
| 7,886,272 B1 * | 2/2011 | Episkopos et al. .......... | 717/124 |
| 7,945,898 B1 * | 5/2011 | Episkopos et al. .......... | 717/124 |
| 7,975,257 B2 * | 7/2011 | Fanning et al. ............. | 717/124 |
| 8,332,822 B2 * | 12/2012 | Nagappan et al. .......... | 717/124 |
| 8,347,267 B2 * | 1/2013 | Givoni et al. ............... | 717/124 |
| 2003/0037314 A1 * | 2/2003 | Apuzzo et al. ............. | 717/125 |
| 2004/0040014 A1 * | 2/2004 | Ball ........................... | 717/130 |
| 2005/0015675 A1 | 1/2005 | Kolawa et al. | |
| 2005/0223361 A1 * | 10/2005 | Belbute ...................... | 717/124 |
| 2006/0041864 A1 * | 2/2006 | Holloway et al. .......... | 717/124 |
| 2006/0069961 A1 | 3/2006 | Kalyanaraman | |
| 2006/0070048 A1 | 3/2006 | Li et al. | |
| 2006/0101331 A1 | 5/2006 | Wang et al. | |
| 2006/0236156 A1 * | 10/2006 | Cunningham et al. ...... | 714/38 |
| 2006/0241909 A1 * | 10/2006 | Morgan et al. ............. | 702/183 |
| 2007/0022407 A1 * | 1/2007 | Givoni et al. ............... | 717/124 |
| 2007/0094189 A1 | 4/2007 | Yamamoto et al. | |
| 2007/0162894 A1 | 7/2007 | Noller et al. | |

(Continued)

OTHER PUBLICATIONS

Li et al., "Code-coverage guided prioritized test generation", Aug. 9, 2006 Elsevier B. V., pp. 1187-1198.*

(Continued)

*Primary Examiner* — Thuy Dao
*Assistant Examiner* — Ben C Wang
(74) *Attorney, Agent, or Firm* — Lee & Hayes, PLLC

(57) ABSTRACT

An exemplary method includes receiving source code having a plurality of code segments, providing a desired level of quality for the source code, analyzing the source code to assign a complexity measure to each of the plurality of code segments and assigning a level of code coverage to each of the plurality of code segments based at least in part on the desired level of quality and the complexity measures. An exemplary system prioritizes quality improvements to source code based, in part, on a quality assessment. Such a system can improve code quality by assigning higher test coverage levels to modules with higher complexity.

20 Claims, 15 Drawing Sheets

(56) References Cited

U.S. PATENT DOCUMENTS

| | | | |
|---|---|---|---|
| 2007/0180429 A1* | 8/2007 | Gogh et al. | 717/126 |
| 2007/0234309 A1* | 10/2007 | Davia et al. | 717/130 |
| 2007/0288899 A1* | 12/2007 | Fanning et al. | 717/124 |
| 2008/0263505 A1* | 10/2008 | StClair et al. | 717/101 |
| 2009/0044177 A1* | 2/2009 | Bates et al. | 717/131 |
| 2009/0055804 A1* | 2/2009 | Blaschek et al. | 717/126 |
| 2009/0265693 A1* | 10/2009 | Bakowski | 717/131 |
| 2010/0180258 A1* | 7/2010 | Takahashi | 717/124 |
| 2011/0022551 A1* | 1/2011 | Dixon | 706/12 |
| 2011/0041120 A1* | 2/2011 | Nagappan et al. | 717/126 |
| 2013/0159964 A1* | 6/2013 | Szpak | 717/124 |

OTHER PUBLICATIONS

Ray et al., "Code-based prioritization—a pre-testing effort to minimize post-release failures", 2012 Springer-Verlag London Limited, pp. 279-292; <http://link.springer.com/article/10.1007%2Fs11334-012-0186-3>.*

J. Jenny Li, "Prioritize Code for Testing to Improve Code Coverage of Complex Software", 2005 IEEE, ISSRE'05, pp. 1-11; <http://ieeexplore.ieee.org/stamp/stamp.jsp?tp=&arnumber=1544723>.*

Observable Reliability, 2010 ACM, ISEC'10, Feb. 25-27, 2010, Mysore, India, pp. 69-72; <http://dl.acm.org/citation.cfm?doid=1730874.1730889>.*

Do, et al., "Prioritizing JUnit Test Cases: An Empirical Assessment and Cost-Benefits Analysis", at <<http://esquared.unl.edu/articles/downloadArticle.php?id=200>>, Aug. 2, 2005, pp. 36.

Elbaum, et al., "Prioritizing Test Cases for Regression Testing", at <<http://delivery.acm.org/10.1145/350000/348910/p102-elbaum.pdf?key1=348910&key2=7703466811&coll=GUIDE&dl=GUIDE&CFID=26276718&CFTOKEN=30781887>>, ACM, 2000, pp. 102-112.

Jeffrey, et al., "Test Case Prioritization Using Relevant Slices", available at least as early as Aug. 9, 2007, at <<http://www.cs.arizona.edu/~ngupta/papers/ngupta-compsac08.pdf>>, pp. 8.

* cited by examiner

PRIORITIZING QUALITY IMPROVEMENTS TO SOURCE CODE

BACKGROUND

Software developers use various mechanisms to enhance the quality of source code during software development. Such mechanisms can add tremendous value by improving quality and user experience as well as by reducing the need for post-release patches. However, such mechanisms can be costly and constrained.

Developers often aim to reach a certain code quality. Source code quality can be measured on attributes such as performance, compliance with expected functionality, robustness, complexity, efficiency, portability, usability of the source code, etc. In general, failures that occur during testing or during use of a software application serve as indicators of how well the application complies with its expected functionality (i.e., does the application function correctly or not?).

A particular approach to finding failures in a software application includes generation of so-called "test cases". Once generated, a set of test cases can be executed to test sections of source code for compliance with expected functionality. A common definition for a test case is a set of conditions or variables under which a tester will determine if a requirement or use case upon an application is partially or fully satisfied. Sometimes it takes many test cases to determine that a requirement is fully satisfied. Thus, a test case can be characterized by a set of conditions which help to determine whether a requirement upon an application is satisfied or not.

In a test case approach to quality, test prioritization helps to determine a test execution order or an order of areas for test case development. For example, some tests may be more pervasive than others and hence results from a pervasive test may be dispositive, i.e., eliminate the need for one or more "lower priority" tests. In the latter instance, test prioritization may simply decide to develop test cases for highly traveled paths. While no particular logic exists as a standard for test prioritization, test prioritization nevertheless can lower costs by raising quality confidence in an efficient way.

Once some source code is tested (or marked for testing), a code coverage metric can be assigned. Often code coverage is assigned after execution of a test case, especially where the degree to which the source code of a program will be tested by a test case is not known a priori.

For all but the simplest of source code, testing is an iterative procedure. To assist in this iterative process, software developers use code coverage tools, for example, to highlight sections of the source code that have not been executed during testing. Risk of failure can be difficult to ascertain for an untested section. For such sections of the source code, further test case development can uncover issues and/or verify performance and, hence, improve quality.

As described herein, conventional code coverage tools that merely allow a tester to identify untested code do not add significantly to quality control. Further, a need exists for test prioritization techniques that can make testing more efficient.

SUMMARY

This summary is provided to introduce simplified concepts of prioritizing quality improvements to source code, which is further described below in the Detailed Description. Implementations for prioritizing quality improvements to the source code are also described.

In one implementation, a system for prioritizing quality improvements to source code receives a plurality of modules associated with the source code as input. The system also receives a desired quality level for the source code as input. The system determines a complexity measure for each of the plurality of modules. The system then assigns a test coverage level to each of the plurality of modules based on the corresponding complexity measures and the desired quality level for the source code. The assignment of the test coverage level to each module optionally includes assigning higher test coverage levels to modules with higher complexity measures.

This summary is provided to introduce a selection of concepts in a simplified form to be further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures. In general, same reference numbers in different figures refer to similar or identical items.

DETAILED DESCRIPTION

Figure 1:
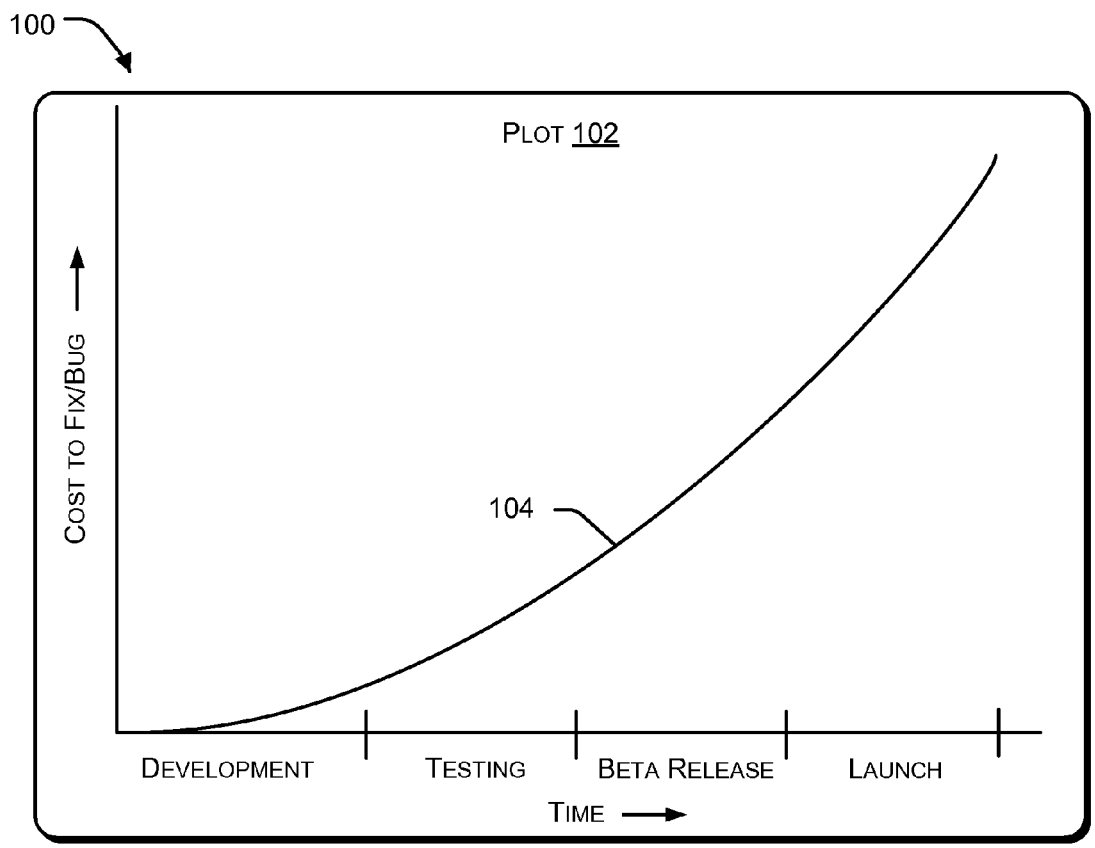
FIG. 1 shows exemplary plots illustrating relationships between attributes of bugs present in source code and multiple stages of a software application life cycle with respect to time.
Figure 1:
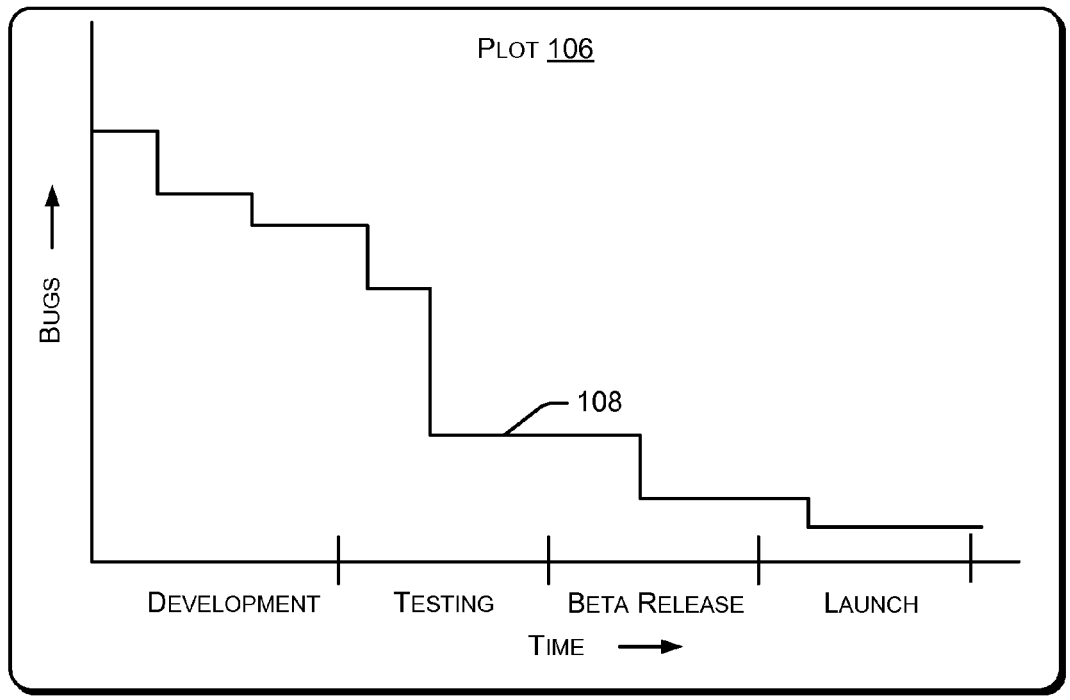

Various exemplary techniques can identify and prioritize test cases to improve quality of source code. Various techniques involve prioritizing test cases by assessing a likelihood of source code to fail. Such an assessment can be based on information from already executed test cases or from complexity characteristics and an understanding of relationships between code coverage, code complexity and code quality.

As explained in more detail below, for some software applications, code coverage alone, can be a poor or misleading indicator of code quality (i.e., code with higher code coverage can actually have a higher chance of failure, at statistically significant levels, than code with lower code coverage).

One measure of quality for a software application is the number of reported failures. Factors affecting cost to fix "buggy" code include the number of reported failures for a software application and the stage in the software development cycle at which the reported failures occurred. In general, failures found late in the software development cycle are more costly to fix. Thus, a strong incentive exists to fix failures early and to reduce the number of failures that occurring at later stages.

Source code quality can be improved during software development using test cases that test functionality of a software application and identify failures in earliest of development stages. Another type of metric that can improve testing is code complexity. A variety of code complexity metrics exist that can identify segments of the source code that warrant testing.

In one implementation, an exemplary system receives a quality level for some target source code, for example, as input by a tester. The quality level can be considered a threshold value that indicates a desired level of quality for the source code. For example, a six sigma quality processes exhibit failures of less than 3.4 per (one) million opportunities (DPMO). For complex code, given a stated level of quality, testing may not always provide an absolute guarantee; yet, given the stated quality level, testing can provide some assurance (e.g., at some confidence level). In this implementation, to determine code coverage for the given quality level, the system relies on code complexity and a priori knowledge of relationships between code complexity, code coverage and code quality. For example, if testing or actual use of a prior version of an application provided data as to coverage and quality, the complexity of the source code for the prior version can be used to understand the relationship between complexity, coverage and quality. This relationship can then be used to estimate code coverage for the new version. Again, as described herein, data indicate that code coverage alone is not always a predictor of quality. In general, the estimated code coverage is simply a starting point for an iterative testing process where test data are used as feedback for identifying segments of code that may require additional coverage to reach a desired level of code quality.

In the foregoing implementation, the system computes a complexity measure for each of a plurality of code segments. The system can then assign a test coverage level to each of the code segments based on the complexity measure and the desired quality level for the source code. For example, based on some a priori knowledge of a relationship between complexity, coverage and quality, code segments with higher complexity measures are assigned higher levels of coverage. Test coverage levels indicate the number of test cases to be executed for one or more code segments in an effort to attain a desired quality level. Test coverage levels are often stated in terms of percentage of source code to be covered by test cases. As described herein, code coverage levels can be determined based on attributes such as artifacts from prior releases, commonly used travel path, number of people using the source code, frequency of usage of the code segment, etc.

Multiple and varied implementations and embodiments are described below. In the following section, an exemplary environment that is suitable for practicing various implementations is described. After discussion of the environment, representative implementations of systems, devices, and processes for prioritizing quality improvements to the source code are described.

Exemplary Computing Environment

FIG. 1 shows exemplary plots 100 illustrating relationships between attributes of bugs present in source code and multiple stages of a software application life cycle with respect to time. The plots 100 include a plot 102 representing a relationship 104 between cost to fix per bug and the stages of the software development cycle.

The cost to fix per bug is the cost associated with fixing each bug or failure in a software application. Generally, each bug corresponds to a failure of the software application to comply with an expected functionality. For example, the cost associated with fixing each bug may be based on the market share lost due to the failure in the software application. In another example, the cost associated with fixing each bug may be based on the time required to debug and fix, or rectify the bug. In yet another example, the cost associated with fixing each bug may be based on the amount of money spent on fixing the bug.

A software development cycle, generally, starts with a development stage. This stage includes writing a set of instructions, also referred to as coding hereinafter, which when executed demonstrate the expected functionality of the software application. The development stage is followed by a testing stage, where the implemented software application is tested for compliance with the expected functionality. A failure in the software application is reported if the expected functionality is not met by the application. Generally, a beta release stage occurs after testing, which includes exposing the software application to a set of users for the purpose of evaluation and getting feedback. The final stage of the software development cycle is the release or launch stage. In the release stage, the software application is considered to be reasonably "bug free" and market ready as having had most of the failures fixed.

The relationship 104 represents changes in the cost to fix each bug with respect to the various stages in the software development cycle. The relationship 104 shows that the cost to fix each bug increases with each stage of the software development cycle. In one example, the cost to fix each bug may be based on the market share lost due to the bug. The cost to fix each bug therefore escalates sharply in the launch stage.

In the development stage, the cost to fix each bug is the least as the coding can be easily corrected as developers often work in coordinate teams that expect bugs to be identified and fixed. The cost to fix each bug increases during the testing and the beta release stages. Each bug reported during the testing and the beta release stages requires debugging of the coded parts of the software application to fix the bug, which can lead to deferment of the release date of the software application in the market. However, if the bug is reported after the release, the cost to fix each bug increases exponentially with each bug reported. Failures in the software application, which correspond to the bugs, can decrease the market share of the software application as customers choose competing software applications or seek other solutions.

The plots 100 further include a plot 106 representing the relationship 108 between the number of bugs found and the stages of the software development cycle. The relationship 108 represents changes in the number of bugs found as the stages of software application life cycle progress with time.

The relationship 108 shows that the number of bugs found in the software application decreases with each stage of the software development cycle. Generally, during the development stage, the number of bugs found in the software application is the highest. The relationship 108 further indicates that the number of bugs found decreases during the testing and the beta release stages.

Typically, as most of the software applications are executed during the development stage, a large section of the expected functionality is validated in that stage itself, thereby reducing the number of bugs found in the testing and the beta release stages. The number of bugs found further decreases in the testing and beta release stages, and is therefore the least when the software application is released in the market. However, as shown by the relationship 108, the number of bugs in the software application remain non-zero throughout the release stage. Such dormant bugs may be found and reported even long after the release of the software application, especially because users may use an application in a manner that was not predicted (e.g., importing files with new types of formats, etc.)

To improve the quality of the code and minimize the number of bugs found after the testing stage, test cases are developed and executed to cover some percentage of the source code. However, as mentioned, the extent of code covered during testing alone is not always a reliable indicator of code quality. This point is discussed below with reference to FIGS. 2 and 3.

Figure 2:
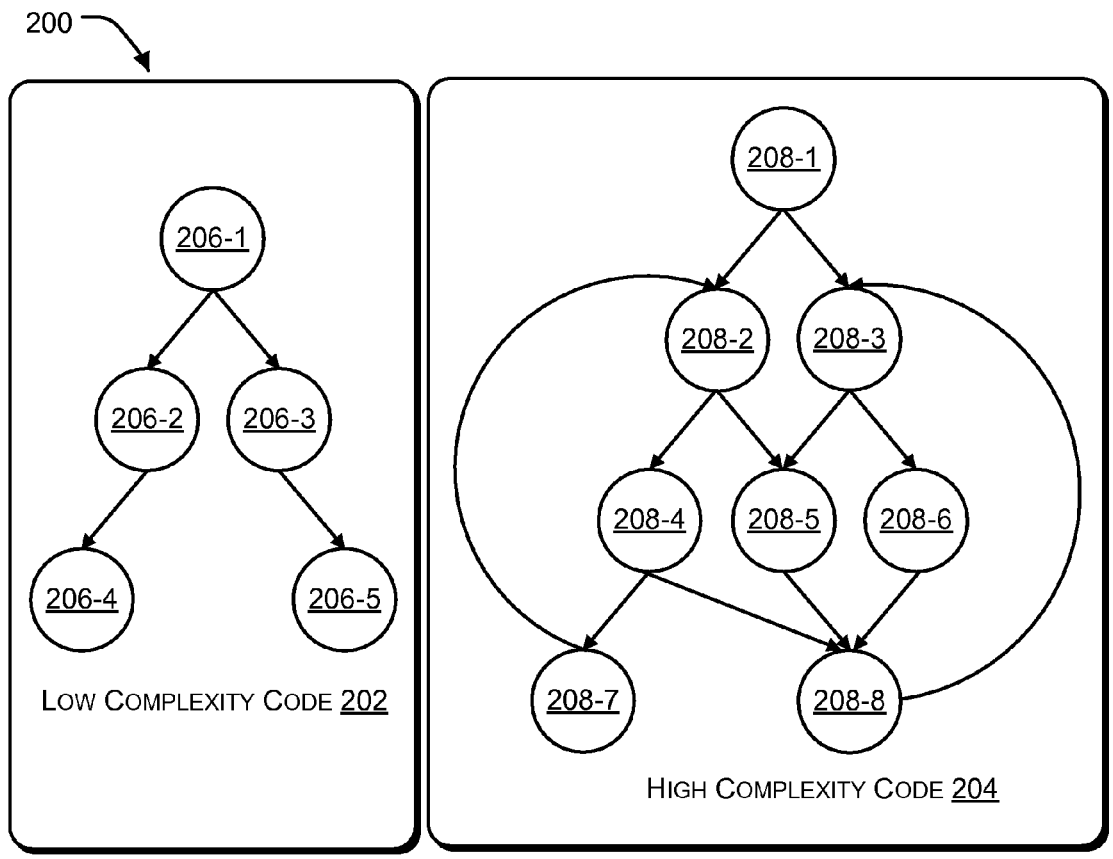
FIG. 2 illustrates an exemplary analysis presenting relationships between code coverage and structural complexity.
Figure 2:
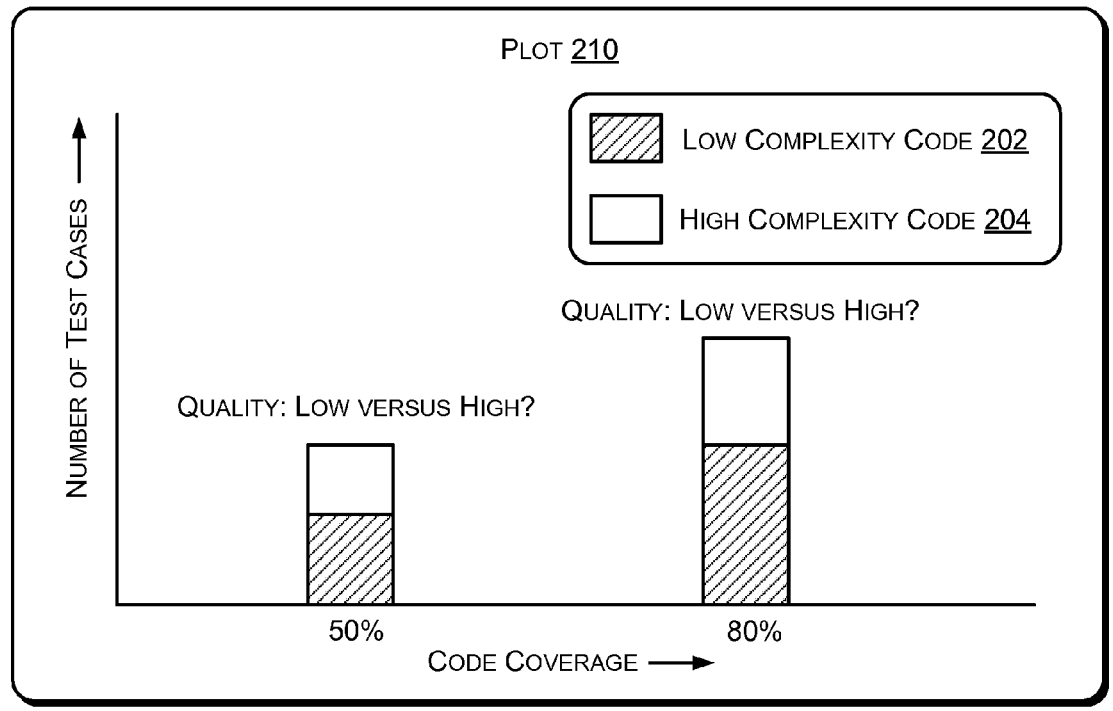

FIG. 2 illustrates an exemplary analysis 200 that presents relationships between code coverage and code complexity. Code coverage is a measure used to describe the degree to which source code of a software program has been tested. Generally, a code coverage value (e.g., percent) can be calculated based on test results obtained from executed test cases for source code of an application. The test cases typically include a set of conditions to determine whether a requirement upon the software application is satisfied. The percentage of source code executed by the test cases can indicate the sections of the source code, which are covered by the test cases and can thus help evaluate code coverage.

Code complexity, also referred to as the structural complexity, is related to the amount of effort needed to understand, maintain, and modify the source code correctly. In one implementation, structural complexity is based on the number of linearly independent paths in the code. For example, structural complexity can be based on the number of decision points in the source code. In one embodiment, cyclomatic complexity can be used to determine structural complexity of source code. Cyclomatic complexity can be calculated by counting the number of decision points, such as if, else, do, while, throw, catch, etc., in code.

The exemplary analysis 200 includes a graphical representation of a low complexity code 202 and a high complexity code 204. The low complexity code 202 may signify, for example, lower branching within the source code which makes the source code easier to understand and test. The low complexity code 202 may also signify that modifications can be made to the source code at a lower risk of failure, which can result in lower number of bugs for the software application.

The high complexity code 204 may signify, for example, higher branching code, which is comparatively difficult to understand and test. The high complexity code 204 can therefore warrant more test cases for better code coverage.

The low complexity code 202 can include one or more nodes 206-1, 206-2, . . . , 206-N, collectively referred to as 206 hereinafter. In one implementation, the nodes 206 correspond to modules in the source code. In another implementation, the nodes 206 can also correspond to a specific function or a code segment to implement a specific functionality in the source code. For example, the node 206-1 may implement a functionality of the software application for which the node 206-1 is dependent on the node 206-2 for execution. After the control is transferred to the node 206-2, the node 206-2 is further dependent on the node 206-4 for its execution.

Similarly, the high complexity code 204 can include one or more nodes 208-1, 208-2, . . . , 208-N, collectively referred to as 208 hereinafter. In one implementation, the nodes 208 correspond to different modules, each of which implements a functionality of the source code. For example, the node 208-1 is a module which implements a functionality of the software application. The node 208-1 is dependent on the node 208-2 for its execution and, therefore, transfers the control to the node 208-2. Similarly, the nodes 208-4, 208-5, 208-6 are dependent on the node 208-8 for execution, which is in turn dependent on the node 208-3, making the source code complex to test and understand.

The exemplary analysis 200 presents a plot 210 showing a relationship between the number of test cases (y-axis) with reference to the code coverage (x-axis) for both the low complexity code 202 and the high complexity code 204. Here, 50% code coverage implies that 50% of the source code is covered by the test cases (i.e., 50% of possible pathways, etc., have been traversed). This also implies that the rest 50% of the source code is uncovered.

The plot 210 shows that for a given code, the number of test cases executed is directly proportional to the code coverage. For example, the number of test cases executed increases with the increase in the code coverage percentage for code 202 and also for code 204. For example, the number of test cases for low complexity code 202 increases when the code coverage increases from 50% to 80%.

The plot 210 also shows that the number of test cases for different source codes can be different at the same code coverage levels. Conversely, if two source codes are tested using similar number of test cases, the code coverage for the two codes can be different. For example, the number of test cases executed for low complexity code 202 at 50% code coverage is less than the number of test cases for the high complexity code 204 at 50% code coverage while the number of test cases for the low complexity code 202 at 80% code coverage and for the high complexity code 204 at 50% code coverage are similar.

The plot 210 demonstrates that every source code having the same code coverage percentage may not be interpreted as having been tested equally. Therefore, achieving a threshold percentage of code coverage may not be a reliable indicator of the code having been adequately tested to meet a certain quality, especially for higher complexity codes. The high complexity code 204, for example, being more complex, can be harder to test and thus may warrant higher code coverage. This shows that the number of test cases to be executed for the source code to reach a particular code quality is not only based on a desired level of code coverage of the source code, but also on the structural complexity of the code. In some cases, if a relationship that links quality to code coverage alone is used for test case development, the tested code may actually have quality that is quite below the desired quality.

Figure 3:
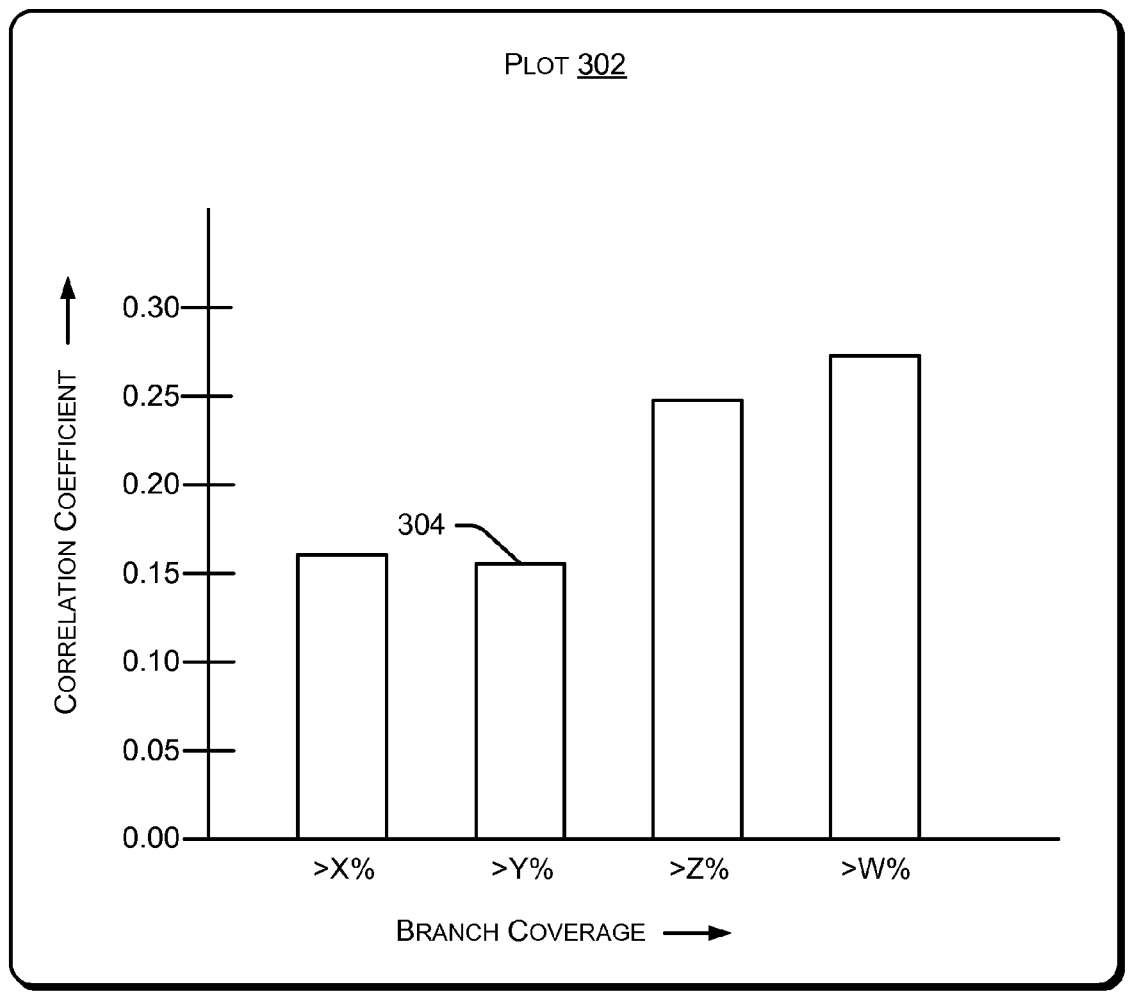
FIG. 3 is an exemplary plot of correlation co-efficient versus code coverage (e.g., branch coverage).

FIG. 3 shows an exemplary plot 302 of correlation coefficient versus branch coverage. A code coverage measure may be based on a branch coverage measure that indicates the percentage of branches in the source code that have been executed. An increase in the branch coverage measure can signify more instructions being executed and tested. The plot 302 can be used to represent a relationship between correlation coefficient of failures in a software application and arc code coverage. Arc code coverage often refers to a measure of code coverage for branching statements such as if, else, while, etc. in source code.

The correlation coefficient is a measure of the correlation between number of failures in a software application and the code coverage measures. The correlation coefficient measure can thereby be used to examine a software application to determine whether code coverage can act as an indicator of number of failures of the application. Generally, it is expected that a higher code coverage results in a lower number of failures, i.e., the correlation coefficient should decrease with an increase in code coverage. However, in some cases, it can be seen that the number of failures uncovered during testing increases with increasing code coverage, at statistically significant levels.

Plot 302 displayed in the FIG. 3 shows changes in the correlation coefficient (y-axis) with respect to changes in the branch coverage measure (x-axis). The plot 302 shows an increase in the values of correlation coefficients with an increase in branch coverage measures when the branch coverage increases over a threshold (e.g., some percentage). For example, the bar 304 shows the value of the correlation coefficient as 0.15 when the block coverage is Y %, which increases to 0.24 when the coverage increases to a higher percentage Z %. For example, for some software applications, the values of the correlation coefficients decrease when the percentage of code coverage is less than 70% and then increase as the percentage of code coverage increases beyond 70%. This shows that, in some instances, there is little quality assurance and high uncertainty, in terms of failures, for a software application that has a code coverage of less than some particular percentage. Further, for code coverage greater than this percentage, such an application can have a positive correlation between code coverage and the number of failures. Therefore, as described herein, code coverage alone is not always a reliable indicator of quality of source code for a software application. In other words, for most complex applications, a quality based on code coverage alone has little assurance. However, other measures such as complexity of code can be used to improve quality of the code as discussed below.

As described herein, code coverage can be based on any of variety of measures. For example, if a code segment has 30 possible states or paths, then code coverage may be given as a percentage of states or paths tested to total states or paths. After tests are run, code coverage is a short-hand phrase for code execution data, which may be a report or other presentation to comprehend what occurred during execution of the tests.

Figure 4:
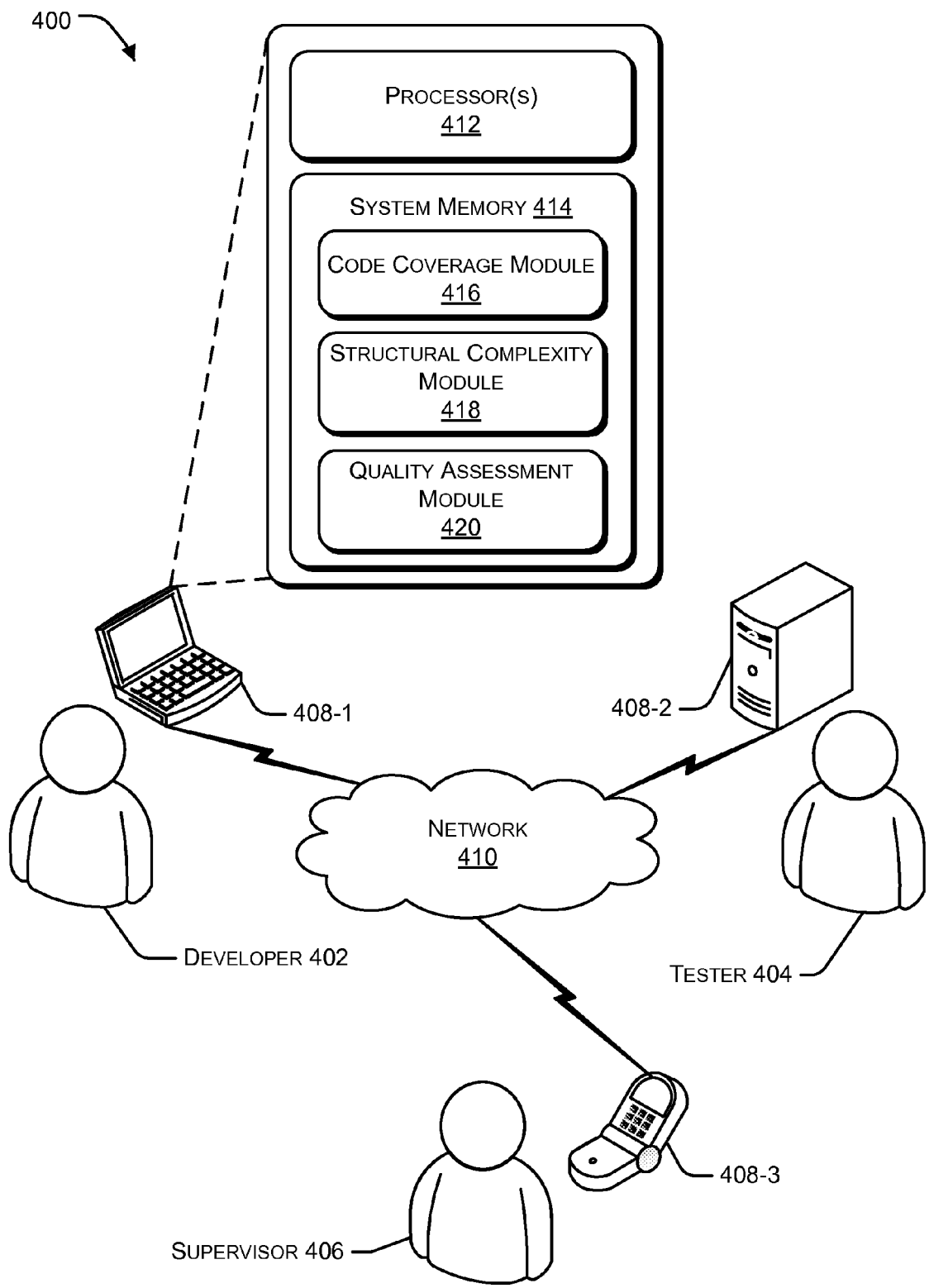
FIG. 4 illustrates an exemplary environment suitable for implementing prioritization of quality improvements to a source code.

FIG. 4 shows an exemplary network environment 400 suitable for implementing various techniques for prioritization of quality improvements to source code. For discussion purposes, the network environment 400 includes a developer 402, a tester 404, and a supervisor 406.

The developer 402 implements functionality of a software application. The developer 402 writes a set of instructions, act of which is referred to as coding, which when executed implement a specific functionality. Depending on specifics of a development cycle, the developer 402 may also write and execute test cases for testing the functionality of the software application.

In the environment 400, the tester 404 tests a software application for its compliance with an expected functionality. Again, depending on specifics of a development cycle, the tester 404 may develop test cases to test the software application. In the environment 400, the tester executes test cases, regardless of their origin. The tester 404 reports failures (e.g., "bugs") in the software application after execution of the test cases. The test cases are generally classified into white box test cases and black box test cases. The white box test cases include tests cases that are written for a software application with knowledge of the internal working of the source code. The black box test cases, on the other hand, use a functional perspective of a software application to derive a set of test cases. Accordingly, the code coverage of the software application can be calculated based on the extent to which the white box and black box test cases test the source code. In the environment 400, the supervisor 406 monitors source code and test case results to understand better quality of the developer's code.

The developer 402, the tester 404, and the supervisor 406, perform their respective tasks and communicate with each other through one or more devices 408-1, 408-2, . . . , 408-n, collectively referred to as 408 hereinafter, through a network 410.

The devices 408 can be implemented as a variety of conventional computing devices, including, for example, a server, a desktop PC, a notebook or portable computer, a workstation, a mainframe computer, a mobile computing device, an Internet appliance, a network router, etc. or a combination thereof that are configurable to prioritize quality improvements to the source code.

The network 410 can be a wireless or a wired network, or a combination thereof. The network 410 can be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

In one embodiment, a device 408 includes a processor 412 coupled to a memory 414. The memory 414 includes a code coverage module 416, a structural complexity module 418, and a quality assessment module 420. The memory 414 may be coupled to or associated with, and/or accessible to other devices, such as network servers, router, and/or other devices 408.

The code coverage module 416 determines code coverage for the source code. As already explained, code coverage is a measure used in software application testing to determine the extent to which a software application has been tested. The code coverage module 416 can also analyze sections of the source code that have not been executed during the execution of test cases for the source code to help recommend test case development. Such recommendations may be performed by the code coverage module 416 or another module that receives information from the code coverage module 416. The code coverage module 416 may also estimate code coverage based on knowledge of similar code (e.g., a prior build or version or code with similar functionality and complexity) that has been tested.

In one implementation, the code coverage module 416 calculates the code coverage for a binary of a software application. A binary of a software application includes source code representation in a processor understandable form, which can be executed directly by a processor. In another implementation, the code coverage module 416 calculates code coverage for an intermediate language (IL) code. An IL code is a common intermediate representation language of a source code, such as Microsoft Intermediate Language (MSIL), which is generated on compilation of the source code. MSIL is associated with the .NET framework, which accepts source code programmed in any of a variety of languages (e.g., object oriented programming languages such as C++, C#, etc.), which are then transformed into MSIL to target a common language runtime (CLR).

The structural complexity module 418 determines a complexity measure for source code that can be used to help assess quality of the code. In one implementation, the complexity measure may be used to determine a level of code coverage that may be required for a desired level of quality. For example, a high complexity measure can indicate higher code coverage requirement for the source code. Test cases can then be developed (e.g., by the developer 402 or the tester 404) to attain a pre-determined level of code coverage and thereby assure better quality compliance of the code. In one embodiment, the structural complexity module 418 can also determine complexity measures for each code segment of a plurality of code segments of the source code. For example, an application may have 10 segments where the complexity module 418 assigns one or more complexity measures to each segment. In general, each segment provides a corresponding functionality, which may rely on functionality of one or more other segments.

In one embodiment, the structural complexity module 418 can compute a cyclomatic complexity measure to determine the structural complexity of the source code. As already mentioned, a cyclomatic complexity measure depends on number of linearly independent paths through a source code. Thus, an overall complexity measure can be stated for a source code and, optionally, individual complexity measures for segments of the source code.

In the example of FIG. 4, the quality assessment module 420 can recommend test case development for the source code based on one or more complexity measures and a desired level of quality for the source code. In one implementation, the quality assessment module 420 receives a quality assessment value that corresponds to a desired level of quality for the source code and also receives one or more structural complexity measures for the source code. The quality assessment module 420 can then compute code coverage required to attain the desired level of quality. The quality assessment module 420 may also provide some recommendations as to test case development. For example, given a complexity measure of source code and a desired level of quality for the code, a level of code coverage can be determined. In turn, the level of code coverage can be used to estimate how many test cases are required for the code and optionally for specific segments of the code. For example, code with a high complexity measure can lead to a high level (e.g., percentage) of code coverage that would thereby warrant more test cases for improving the code coverage. Again, as explained with respect to FIG. 3, such a technique may rely on an a priori knowledge of a relationship between code coverage and quality.

In another implementation, the quality assessment module 420 computes the quality assessment value based on the complexity measure and existing code coverage. As mentioned, code testing usually occurs in an iterative manner. Hence, after a first iteration, then such an exemplary technique may provide information germane to a subsequent iteration. After each iteration, an assessment may be made as to the nature of the code, for example, is the pattern aligning with a prior build or version? Or, is it deviating? Where the pattern deviates, then the guidance provided by any preexisting relationship to help determine coverage with respect to quality may be diminished.

In general, the quality assessment module 420 can weight the likelihood-to-fail of various code segments, for example, based on one or more analyses or measures. In turn, the quality assessment module 420 can generate a prioritized list of areas to develop tests against.

After a first iteration, a quality assessment value (e.g., failures per test, etc.) can help in identifying segments of the source code that warrant test case development. In such an example, the identification may be based in part on some estimated levels of code coverage to reach a certain quality.

As testing usually occurs based on a set of tests, information as to order of the individual tests can be useful. In general, a test that is likely to expose extremely useful information should be performed earlier than a test that is less likely to expose useful information. For example, a test case that tests a key function of an application can be positioned earlier in a set of test cases than a test case that tests some less important function, especially where the less important function may be less complex and easier to fix if a failure occurs. Hence, as described herein, an exemplary method can prioritize test cases or prioritize segments of code for testing. In the example of FIG. 4, the quality assessment module 420 may prioritize identified code segments, for example, based on levels of code coverage for the code segments.

In yet another implementation, the quality assessment module 420 can recommend test case development based on information, such as artifacts from previous releases, usage of the source code, travel path used in the source code, runtime contexts, manual estimation, etc.

As described herein, a runtime collection mechanism can track data (e.g., values for arguments, globals, etc.), frequently executed code paths, information regarding thread execution, etc., and use such information to prioritize test cases or test case development. In particular, the quality assessment module 420 can rely on structural complexity and/or other information. For example, the module 420 may use one or more analysis measures such as semantic metrics, dependency analysis, etc.

Various exemplary methods are described below that may be implemented using the device 408.

Figure 5:
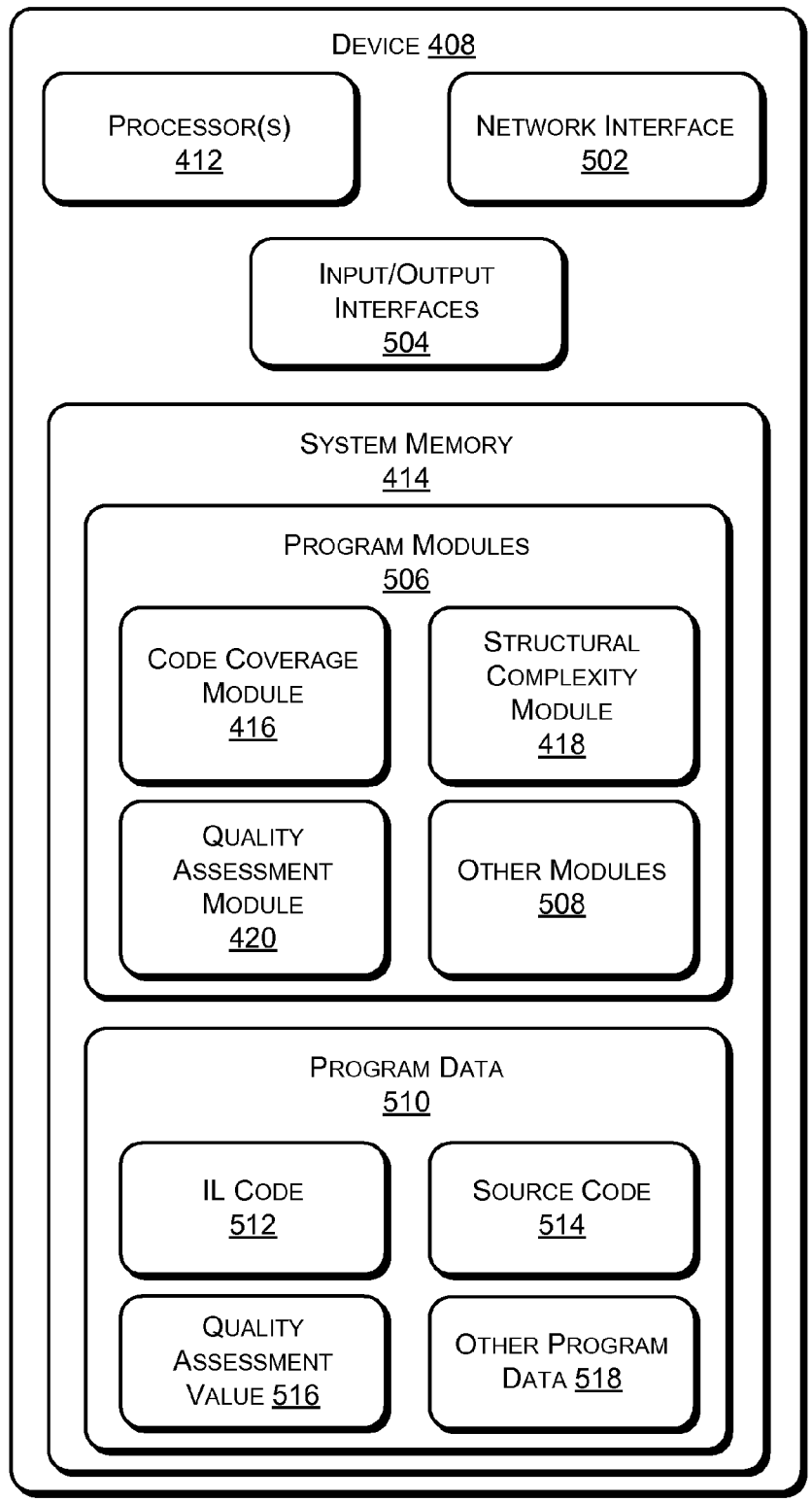
FIG. 5 illustrates an exemplary computing device for prioritizing quality improvements to the source code.

FIG. 5 illustrates various components of the exemplary device 408. In one embodiment, the device 408 can include, but is not limited to, the processor 412, a network interface 502, the system memory 414, and an Input/Output Interface 504.

The network interface 502 can enable the device 408 to receive a software application's source code and share results of quality assessment over a network (e.g., the network 410). For example, the supervisor 406 of FIG. 4 may monitor changes to the source code of the application and development of test cases.

The memory 414 includes computer-readable media in the form of volatile memory, such as Random Access Memory (RAM) and/or non-volatile memory, such as Read Only Memory (ROM) or flash RAM. The memory 414 typically includes data and/or program modules for implementing prioritization of quality improvements to source code that are immediately accessible to and/or presently operated on by the processor 412. In one embodiment, the memory 414 includes the code coverage module 416, the structural complexity module 418, and the quality assessment module 420. The other modules 508 may include other software that assists in the functioning of the computing device 408, such as an operating system. The program data 510 may include an IL code 512, source code 514, a quality assessment value 516, and other data 518 specific to the system or the applications.

Where some testing has already occurred, the code coverage module 416 can measure code coverage for the source code 514 of the software application based on the lines of source code that have been executed. The module 416 can also signify the degree to which the source code 514 has been tested.

In one embodiment, the code coverage module 416 can evaluate block and arc coverage to help determine a code coverage measure. As mentioned, block code coverage includes a set of instructions that have no branches. Thus, for evaluating block code coverage, the code coverage module 416 assumes that if one line of the source code from the set of lines or instructions is executed, all the remaining instructions would be executed. The arc code coverage, on the other hand, evaluates conditional statements such as if, while, for, while calculating the code coverage.

In one implementation, where some testing has occurred, the code coverage module 416 receives information about executed test cases and then analyzes the source code 514 to determine a code coverage measure for the source code and/or code coverage measures for segments of the source code. The code coverage module 416 can also identify and analyze sections of the source code 514, which are not covered by the test cases. A test case development process can then be implemented to increase the percentage of coverage for the source code. Such a process includes providing and executing tests to cover the sections of the source code 514 that have not been tested. Where suitable test cases are not already written, the process may include writing test cases.

In another implementation, the code coverage module 416 can also analyze a binary or an IL representation of the software application. The binary representation includes presentation of the software application in a processor or a machine readable format. The IL representation is a transformed version of a source code. Object-oriented programming languages such as C#, Visual Basic (VB), C++ can all be represented in the common IL representation such as MSIL.

For MSIL, when compiling to managed code that targets the .NET framework CLR, a compiler translates the source code into MSIL, which is a CPU-independent set of instructions that can be efficiently converted to native code for a particular computing architecture. MSIL includes instructions for loading, storing, initializing, and calling methods on objects, as well as instructions for arithmetic and logical operations, control flow, direct memory access, exception handling, and other operations. Before MSIL code can be run on a computing device, it must be converted to CPU-specific code, usually by a just-in-time (JIT) compiler. Because the .NET framework CLR supplies one or more JIT compilers for each supported computer architecture, the same MSIL code can be JIT-compiled and run on any supported architecture.

In yet another implementation, the code coverage module 416 can also analyze specific code segments of the source code. The code coverage for each code segment can be computed independently based on sections of the code segment that are not executed by the test cases also referred to as the uncovered sections. The code coverage module 416 can also analyze distributed applications (e.g., Web 2.0 applications) to calculate code coverage.

In one implementation, the code coverage module 416 determines percentage of uncovered source code. The uncovered source code includes sections of the source code that have not been executed by the test cases. For example, 95% uncovered code coverage implies that only 5% of the entire source code has test cases corresponding to it to test the functionality. The code coverage measure may be used in addition to the structural complexity measure to assess quality compliance of the code.

The structural complexity module 418 determines one or more complexity measures for the source code 514. In one implementation, a complexity measure is used to determine the level of code coverage that may be required for a desired level of quality of the source code 514. For example, a higher complexity measure can indicate higher levels of required code coverage. This indicates that the more complex the source code 514 is, higher is the code coverage requirement, and more the number of test cases that need to be written for the desired level of quality.

In one implementation, the structural complexity module 418 uses a cyclomatic complexity measure to calculate complexity of source code. Cyclomatic complexity uses graph theory and is based on the number of linearly independent paths in a source code. Nodes of the graph correspond to instructions of the source code, and the edges correspond to the sequence of execution of the commands.

The structural complexity module 418 can also identify structural complexity metrics such as coupling, and depth of inheritance to evaluate the structural complexity of the source code. The depth of inheritance is based on the hierarchy of a code segment in the source code. The deeper the code segment is in the hierarchy, the greater the number of code segments it is likely to depend on, making it more complex to predict its behavior. Coupling, on the other hand, indicates the dependency of one code segment over another. A higher coupling between two code segments corresponds to a higher structural complexity.

In one embodiment, the structural complexity module 418 measures the structural complexity of each code segment of the source code that provides a specific functionality to the software application. In another embodiment, the structural complexity module 418 can also measure the structural complexity based on an intermediate representation 512 of the source code 514 (e.g., IL). In yet another embodiment, the structural complexity module 418 calculates the complexity of one or more components of the software application. Each component can be a logical block of the source code for which one or more complexity metrics can be extracted.

In one implementation, the structural complexity module 418 analyzes the structural complexity using a binary metadata reader. The binary metadata reader extracts metrics (e.g., associated with complexity) from the binary of the source code 514. In the .NET framework, metadata is binary information stored in the binary describing the source code 514. When the source code 514 is compiled into the binary, also known as a portable executable (PE) file, metadata is inserted into one portion of the binary, while the IL code 512 is inserted into the other portion of the binary. The metadata references code segments, types of data, etc., in the source code 514 so that when the source code 514 is executed, the metadata can be loaded first in the memory to give information about the code segments, code members, inheritance, and so on.

The quality assessment module 420 uses a quality assessment value to recommend test case development for the source code. In one implementation, the quality assessment value may correspond to a desired level of quality for the source code. In one implementation, the desired level of quality can be determined for each code segment based on artifacts from previous releases, usage of the source code, frequency of usage, travel path used in the source code, runtime contexts, manual estimation, binary owners, etc.

The quality assessment value can then be used to identify the level of code coverage required for each code segment, for attaining the desired level of quality based on the complexity measure of the source code. Such level of code coverage can then be used as a reference to write new test cases to improve the existing code coverage. For example, higher levels of code coverage can be associated with a source code having higher complexity measures when compared with another source code having lower complexity measures.

In another implementation, the quality assessment module 420 computes the quality assessment value based on the existing code coverage and code complexity measure of the source code 514. An exemplary quality assessment value can be expressed as follows:

Quality Assessment Value=Code Complexity/Code Coverage.

A quality assessment value can help identify code segments of the source code 514 that warrant test case development by identifying new levels of code coverage for the code segments. The quality assessment module 420 can also prioritize the identified code segments based on the quality assessment value. For example, a source code with lower code coverage and high complexity measure can have higher priority for test case development as compared to a source code with lower code coverage and low complexity measure.

In yet another implementation, the quality assessment module 420 identifies code segments of the source code 514 that need refactoring. The identification includes finding code segments of the source code 514, which are complex and less understandable. Such code segments can also be identified based on the complexity measures of the source code. The identified sections of the source code 514 can be re-written to make the sections more testable and simpler to understand.

The level of code coverage can be used to indicate completeness of a test case development process, for example, relative to a desired standard of reliability. The code segments can also be prioritized based on the level of code coverage. For example, code segments with higher complexity can have higher levels of code coverage and be assigned a higher priority.

Multiple quality assessment values R1, . . . , Rn, for n different types of code coverage measures and complexity measures, can be provided. The code coverage measures include measures such as block coverage measure, arc coverage measure, statement coverage measure, function coverage measure, and branch coverage measures. The complexity measures can include complexity metrics such as coupling, depth of inheritance. For example, consider the following metrics:

$R1$=Overall complexity (method, file, binary, component)/Block Coverage;

and $R2$=Overall complexity (method, file, binary, component)/Arc Coverage.

In one implementation, the overall complexity measures mentioned above includes complexity at various levels of the source code 514. For example, the complexity can be calculated for a specific method of the source code 514 or for the whole file of the source code 514. The complexity can also be calculated for the binary using the binary metadata reader, or for a specific component of the source code 514.

In an exemplary method, a quality assessment value is used for setting expected code coverage bounds in a manner that accounts for complexity of a selected source code. For example, if R1 and R2 measures are set to 30.0 and 25.0 respectively, then a method in the source code (e.g., a segment of the source code) with a cyclomatic complexity of 150 should have a code coverage level of 5% and a method with a cyclomatic complexity of 1500 should have a code coverage level of 50%. Such an approach to quality is relative and can be adjusted according to the complexity of a selected source code to determine appropriate code coverage levels between 0-100%.

In the example of FIG. 5, the quality assessment module 420 can also compute the level of code coverage based on different weightings and coefficients associated with different code coverage and structural complexity measures. In this example, the different weightings and coefficients are adjustable, for example, based on the relevance of the code coverage and the structural complexity measures. For example, an arc code coverage measure may not be very relevant in a source code that does not have many conditional or branching expressions.

In one implementation, one or more levels of code coverage can be calculated for a list of code segments based on the desired level of quality and the structural complexity measures. In such an implementation, the quality assessment module 420 prioritizes a list of methods for test case development based on the level of code coverage of each code segment. For example, a code segment with a structural complexity of 1200 would have a higher priority over a code segment with a structure complexity of 1100.

In another implementation, the quality assessment module 420 calculates the quality assessment value corresponding to the desired level of quality based on a set of artifacts used from one or more previous releases of a software application. The artifacts may include attributes such as, bugs reported, people involved in development of the software application, usage of the software application, etc., that can help generate data to improve quality of the source code 514 of the software application. The quality assessment module 420 can receive fine tuning data and calculate a quality assessment value based on the fine tuned data. For example, the bugs found in a previous release can help to assess common types of failures in a software application and can thus help adjust one or more coefficients for a selected source code for purposes of calculating a quality assessment value.

In yet another implementation, the quality assessment module 420 calculates the level of code coverage for prioritizing the code segments based on the travel path of the code segment within the source code. The travel path can be based on attributes such as context, the frequency of usage, security concerns, the number of people using it, etc. For example, a code segment having the same code coverage and the structural complexity as another section but having a higher travel path can be assigned a higher priority for test case development.

In one embodiment, the quality assessment module 420 can identify code segments of the source code 514 that warrant further test development based on an object code and a program database (PDB) file corresponding to the source code 514. In this example, the object code, also referred to as the object file, includes a representation of the source code 514 that a compiler or assembler generates after processing the source code file 514. Typically, the PDB file holds debugging and source code information and can help in retrieving source code information from the object code. Such information can be used for any of a variety of purposes for test case development and, optionally, prioritization of test cases.

Further, the quality assessment module 420 can incorporate a feedback or a learning loop to enhance quality assurance. A feedback or learning loop can include calculating a level of code coverage recursively based on changes made to the source code 514. For example, consider a scenario where the quality assessment module 420 calculates a level of code coverage for a code segment of the source code 514 that corresponds to one or more methods. The code segment can then be refactored based on the level of code coverage. The quality assessment module 420 can then calculate a modified level of code coverage based on the refactored segment. Such a feedback mechanism can help evaluate the improvements in the source code 514. The feedback can also help in getting a new prioritized list of methods every time the source code 514 is changed or refactored. The quality assessment module 420 can also align parameters and coefficients associated with the code coverage measures and the structural complexity metrics based on the feedback.

In one implementation, once the quality assessment module 420 has analyzed the code, it proceeds to prioritize a list of methods based on a desired level of quality (e.g., for each individual method or the source code as a whole) and structural complexity measures for each of the methods in the list. The quality assessment module 420 can present the prioritized list of methods to a user on a user interface. The presentation of the prioritized list of methods can help a developer 402 (e.g., or a tester 404 or supervisor 406) visualize a method's reliability by mapping the source code location of the method to one or more analyses provided by the quality assessment module 420. Each analysis can be based on the coefficients and weightings of the code coverage and structural complexity measures. In one embodiment, the quality assessment module 420 prioritizes the sections of the source code 514 and also presents some lines of instructions for one or more of the sections, optionally with a corresponding analysis. Where a section of the source code 514 is adequately covered and error free, the section may be marked or listed as needing no further testing.

Further, the quality assessment module 420 can associate risk levels to each method or section of the source code 514. The risk levels, which can be ascertained based in part on a quality assessment value, can indicate a likelihood of failure. For example, the risk levels may be presented in the form of a tri-state setting indicating a high level of risk, a medium level of risk, or a low level of risk. In an embodiment, the quality assessment module 420 can also specify an arbitrary number of priority levels as numeric indexes. The quality assessment module 420 can also alter underlying thresholds, which determine the priority level of risk to be associated with a method or section of the source code 514.

Figure 6:
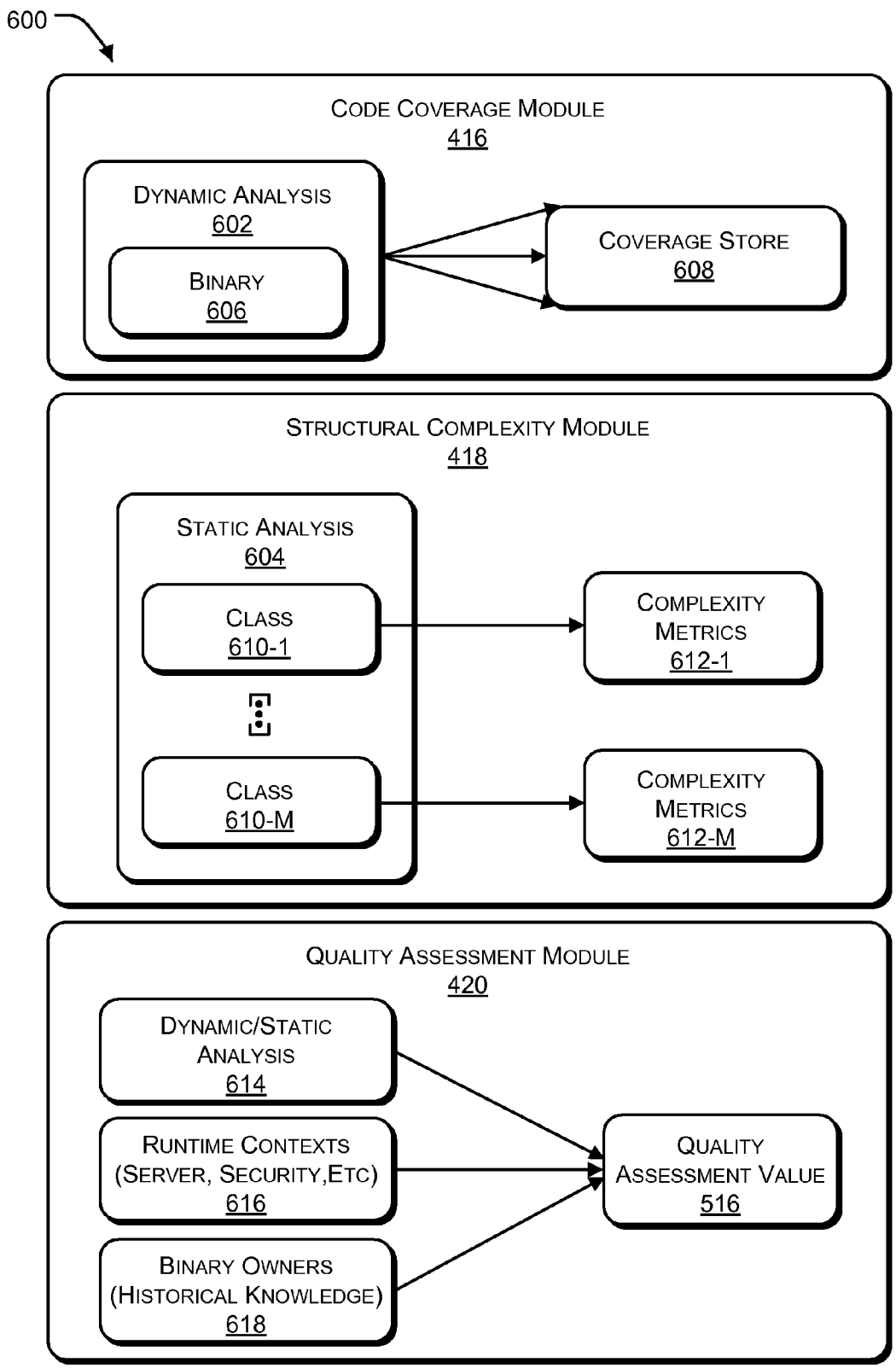
FIG. 6 presents an exemplary schematic showing various components of the system used to assess a source code's likelihood-to-fail.

FIG. 6 presents an exemplary schematic 600 showing one or more components for the code coverage module 416, the structural complexity module 418, and the quality assessment module 420. The code coverage module 416 includes a dynamic analysis component 602 and the structural complexity module 418 includes a static analysis component 604 configured to assess a source code's likelihood-to-fail. The dynamic analysis component 602 analyzes the code coverage of a software application based on the execution of the software application through the test cases. The static analysis component 604 performs analysis of the structural complexity of a software application without executing the software application.

The dynamic analysis component 602, also referred to as runtime component, includes a binary 606 corresponding to a software application. In one implementation, the dynamic analysis component 602 is configured to provide code coverage information of the binary to a coverage store 608. The code coverage information includes the usage of the binary in terms of what sections of the source code of the software application are executed through the test cases. The information can also include the amount of time for which section runs and its frequency of execution.

The dynamic analysis component 602 can also be associated with a runtime context to evaluate the binary's likelihood-to-fail. The runtime context can be based on whether a software application runs on a server or on a client machine. A software application running on a server machine, for example, can include high value information (e.g., stock transactions, banking, etc.) and cost of failure may be significant. Software applications that can fail an corrupt data can also introduce significant cost; such applications may also be classified as high-priority software applications. Another attribute of a runtime context can be security concerns of a software application.

In the example of FIG. 6, the static analysis component 604 is configured to extract complexity metrics from the binary 606. In one implementation, the binary 606 is segregated based on classes 610-1, . . . , 610-M, referred to as 610 hereinafter. The complexity metrics 612-1, . . . , 612-M, referred to as 612 hereinafter, can be extracted for each class 610. In another implementation, the binary 606 can also be classified based on code segments of the source code or on methods/functions of the source code.

The exemplary schematic 600 further includes one or more components for the quality assessment module 420. The quality assessment module 420 can assess likelihood-to-fail based on the complexity measure and a desired level of quality for the source code. In one implementation, the quality assessment module 420 determines a level of code coverage required for attaining a desired quality based on the complexity measure and the quality assessment value 516.

The quality assessment module 420 includes a dynamic/static analysis component 614, a runtime context component 616, and a binary owner's component 618 to determine the quality assessment value 516. The dynamic/static analysis component 614 includes determining the quality assessment value 516 based on code coverage and one or more complexity measures for source code. For example, an existing level of code coverage can be determined by the code coverage module 416 based on the uncovered percentage of source code. One or more complexity measures can be computed by the structural complexity module 418 to determine the complexity of the code. The quality assessment value 516 can then be determined based on the code coverage and complexity measures.

The quality assessment module 420 can determine the quality assessment value 516 based on the runtime context component 616. The runtime context component 616 determines the software application's characteristics such as runtime setting (e.g., client or server) and security.

The quality assessment module 420 can also determine the quality assessment value 516 based on the binary owner's component 618. The binary owner's component 618 includes a static analysis mechanism to determine the quality assessment value 516 based on the historical knowledge of the software application. A binary owner can include a software developer that manages and develops the software application. In one embodiment, if 60% of a development team is new and lacks historical knowledge, the binary owner's component 618 can provide such information (e.g., newness of the team), which, in turn, may be used to assess quality. Experience of an individual developer or a team may be used in conjunction with measures such as structural complexity to determine a quality assessment value. For example, complex code developed by an inexperienced developer may benefit from more testing (i.e., greater code coverage to reach a desired level of quality).

Figure 7:
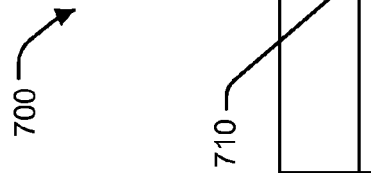
FIG. 7 illustrates an exemplary presentation of a per-binary breakdown of the structural complexity and the code complexity information for a managed binary.

FIG. 7 shows an exemplary presentation of quality assessment information 700 that can be displayed to a user on a graphical user interface (GUI). The presentation 700 shows a binary hierarchy 702 with associated structural complexity 704, code coverage information 706 and risk level 708. The example of FIG. 7 pertains to managed binaries; as mentioned, the .NET framework provides a CLR for execution of managed binaries.

The hierarchy 702 organizes the source code by namespaces, types, and members of the source code. The hierarchy 702 can include an author, a date, and a time attribute 710. The author attribute shows the creator of the binary, whereas the date and the time attributes show the timestamp of when the binary was created or modified.

The structural complexity 704 shows the structural complexity measures for each class of the binary. For example, the "Microsoft.Expression.Web" class has a structural complexity of "787". In one implementation, the structural complexity is extracted from an IL representation of the code (e.g., using a cyclomatic complexity measure).

In the graphic 700, the code coverage metric 706 indicates percentage of the source code that is not covered (i.e., uncovered) by the test cases. In one embodiment, the percentage of blocks that are not covered by the source code, is an indicator of the sections of the source code that do not have corresponding test cases. For example, the "Microsoft.Expressions.Web.Profiling" class has an uncovered percentage which equals to 100%, thereby implying that there are no test cases executed for the class. This can also imply that there are no test cases written for this class.

As mentioned, the quality assessment module 420 can associate a risk level 708 with each class of a binary. In one implementation, the risk level associated with each class is based on the level of code coverage required by the class, which in turn is determined based on the quality assessment value 516 and the complexity measures identified by the structural complexity module 418. For example, source code with high complexity measures leads to higher level of code coverage requirement. The risk level 708 for a segment of code may change as such code is tested and as coverage increases or, alternative, the risk level 708 may indicate a general level of risk (e.g., associated with complexity, historical information, etc.).

The exemplary presentation 700 associates the risk level 708 in the form of a tri-state setting indicating a high level of risk, a medium level of risk, or a low level of risk. The risk level column 708 is sortable (as are all others), for example, by clicking on a column heading. In another implementation, numeric indexes rather than tri-state icons can be reported as the risk level 708, which may be sortable and which can provide more granularity for evaluating results.

Figure 8:
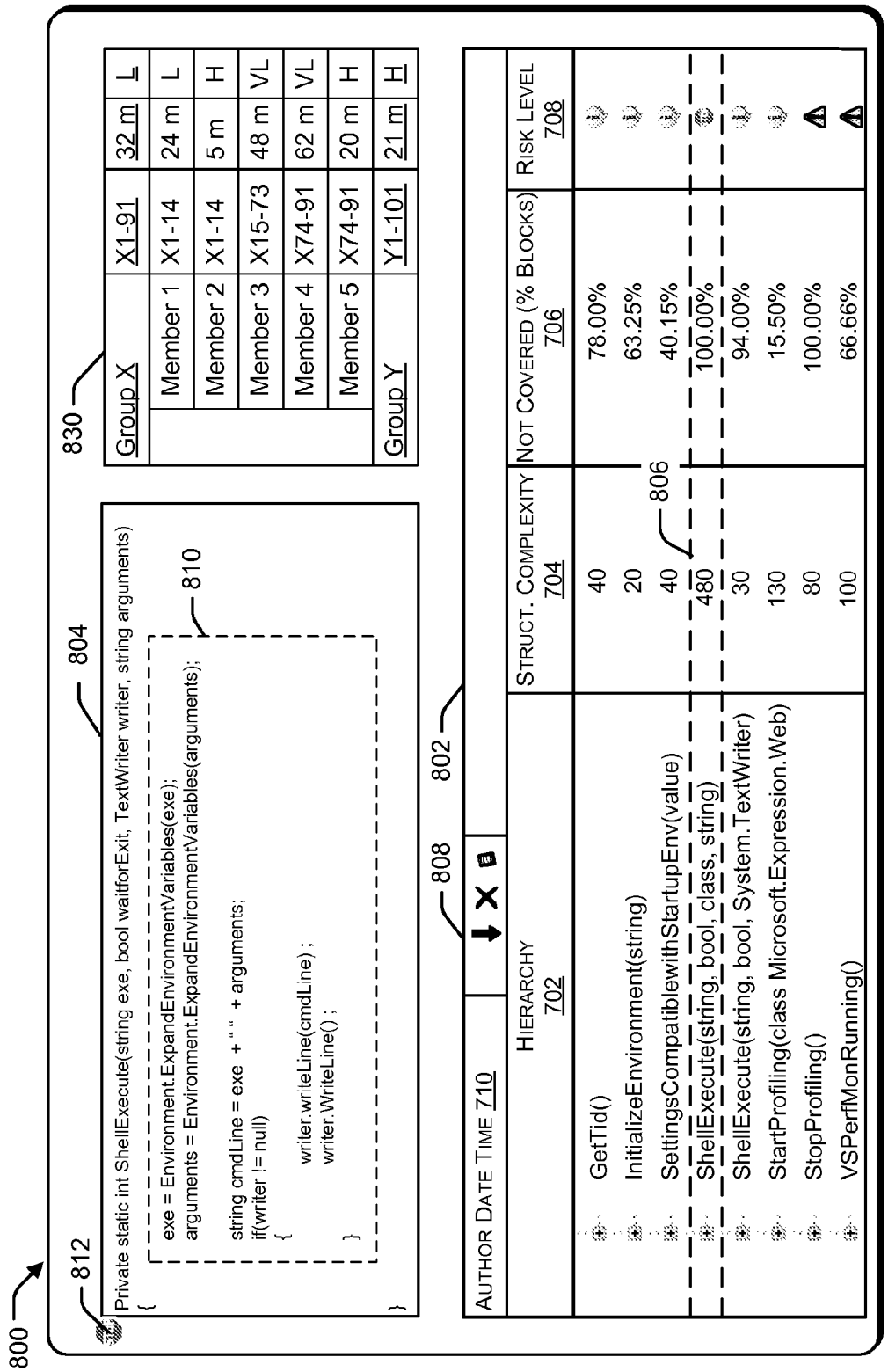
FIG. 8 illustrates an exemplary presentation of sections of source code and associated code coverage measures, structural complexity metrics and risk levels.

FIG. 8 shows an exemplary presentation of quality assessment information 800 that can be displayed to a user on a graphical user interface (GUI) (e.g., consider the devices 408 of FIG. 4). The presentation 800 displays the structural complexity measures 704, the code coverage measures 706 and the risk levels 708 corresponding to various segments of source code.

The presentation 800 includes a view 802 showing the hierarchy 702 drilled down to the member/function level view and showing data related to methods and functions. The view 802 also shows an author and a timestamp 710. Each function in the hierarchy 702 is associated with a corresponding structural complexity measure and a corresponding code coverage measure. For example, the function ShellExecute (string, bool, class, string) has a structural complexity of 480 and a 100% uncovered code implying that no test cases have been executed (and/or written) to test and execute the function.

The presentation 800 also includes an Integrated Development Environment (IDE) view 804 showing source code corresponding to a function 806 highlighted in the view 802. In one implementation, a function in the view 802 is selected by double-clicking the function. In another implementation, a function is selected using the toolbar 808 in the view 802. The toolbar 808 can also be used to delete a function from the list of functions in the view 802.

The view 804, as described above, shows the source code corresponding to the function 806 highlighted in the view 802. For example, the highlighted function 806 refers to the function ShellExecute (string, bool, class, string) having a structural complexity of "480" and a 100% uncovered code. A 100% uncovered code suggests that no test cases have been executed (and/or written) for the function, and thus a high risk level can be associated with the function in view of its structural complexity.

The marked section of the source code 810 in the view 804 indicates the path coverage of the source code through the function. The marked section 810 indicates that there has been no coverage for the code in this section and that the function has not even been entered. The marked section of the source code 810 can also be highlighted in color to show the travel path coverage of the source code through the function. The specific color associated with unexecuted paths can indicate a function's priority level like high-priority, medium priority, or low priority. An icon 812 on the left margin can also be used to indicate the priority, such as a high priority, given to the highlighted function 806 to focus on for test case development. In the example of FIG. 8, based on a quality assessment value which corresponds to a desired level of quality and on a complexity measure (e.g., which is very high: "480" in the above example function 806), the selected portion of the function can be determined to have a high code coverage level requirement.

The visual presentation 800 can also be changed to a textual view. The textual view includes a numeric risk/priority value associated with the function rather than a colored indicator of the risk/priority.

The visual presentation 800 can also be based on a binary and a source code view. The binary view can include a set of ".dll" files of the binary of the software application. The binary view can map classes in the ".dll" files with the risk levels based on the levels of code coverage. Locations in the classes can also be identified based on the sections of the classes that warrant further test case development.

The source code view, on the other hand, includes a set of source code files such as, .cpp files, within a directory. The locations in the source code files can then be identified based on the sections of the source code files that warrant further test development. For example, consider a directory "x" that includes two source code files, "a.cpp" and "b.cpp". The locations can be identified for the source code files based on the risk levels associated with the files, which can be optionally based on associated levels of code coverage.

The visual presentation 800 can further include a people view 830. The people view 830 can include a list of members (e.g., a set of names such as, Mike, Jeff, etc.) within a group and associate the different segments of the code with the members of the group (e.g., X1-14, X15-73, etc.). The view 830 can also associate risk levels with each person based on an assessment of the quality of source code written by the person and, for example, months of experience. For example, consider the Group X that includes members 1 through 5 where the overall group has an average experience of 32 months and a low risk. The risk levels can also be associated with each person based on the level of code coverage for the source codes written by them, which is further based on the desired level of quality and complexity measures of the source code.

Figure 9:
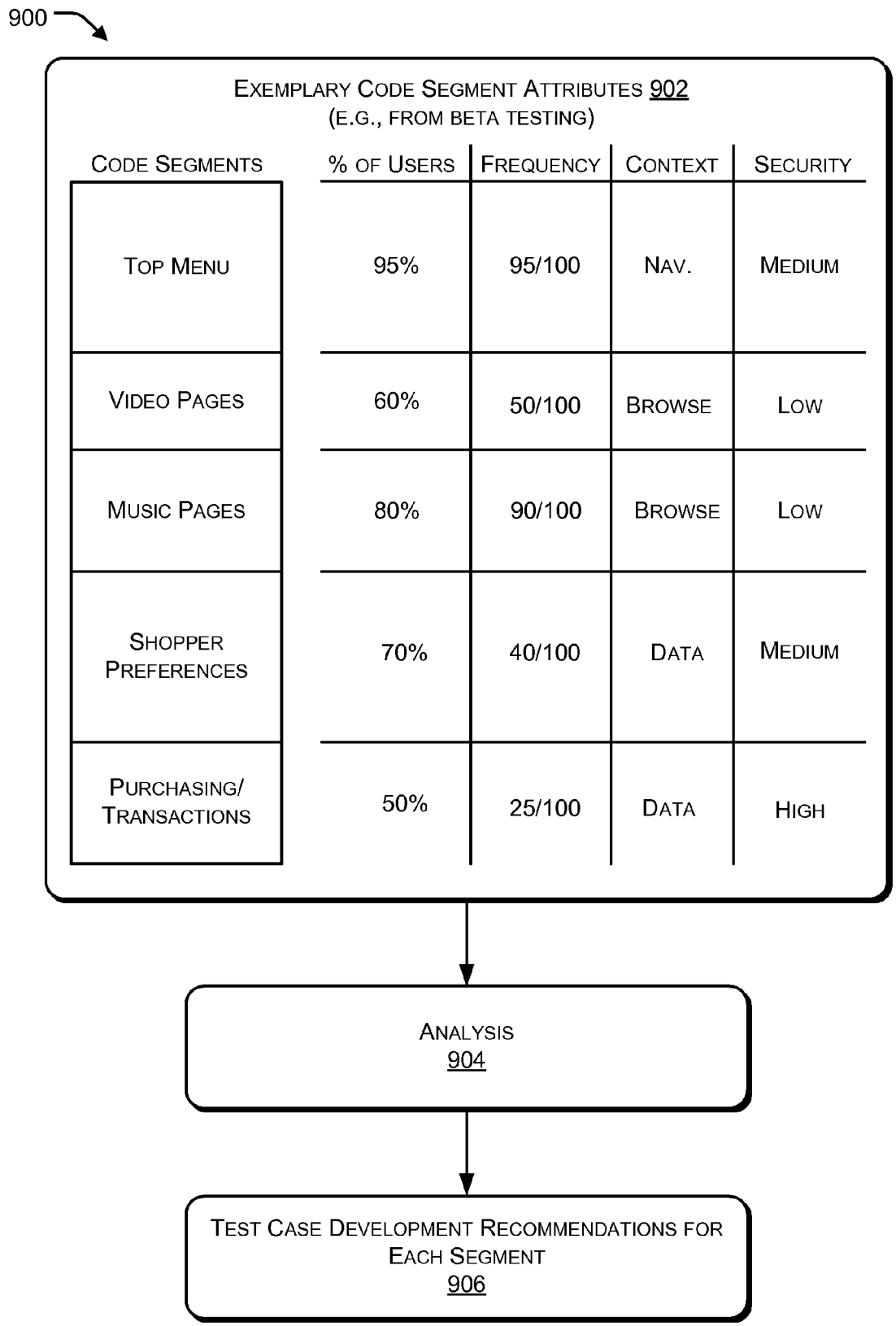
FIG. 9 illustrates exemplary attributes used to recommend test case development for one or more code segments.

In addition to the level of code coverage, other attributes such as, number of users using the code, frequency of usage, context or functionality of the code, and security level required can also help in determining the extent of test case development required as shown in FIG. 9.

FIG. 9 illustrates exemplary schematic 900 including exemplary attributes 902 that can be used in an analysis 904 to recommend test case development for one or more code segments 906. Multiple attributes such as percentage of users using the code segment, frequency of usage, context of the code segment, security level required, and number of bugs found in similar code segments can help prioritize the levels of code coverage required to attain the desired level of code quality.

For example, the exemplary parameters 902 include multiple attributes for one or more code segments. In one embodiment, the code segments are differentiated based on the context of the code segment. For example, the top menu code segment provides a navigation bar that helps in navigation of the application. Similarly, the music pages generally relate to browsing of the songs.

At step 904, the code segments are analyzed based on the attributes of the code segments. The analysis includes comparison of the attributes for one or more code segments to determine relevance and importance of the attributes to the code segment. For example, the purchasing/transactions code segment requires a high security level and half of the users accessing the application also use this code segment attaching a very high level of importance to the code segment. Video pages, on the other hand, require low security levels and are mainly browsed making them relatively lower in priority as far as the test case development is concerned.

At step 906, test case development recommendations are given based on the analysis done at step 904. For example, purchasing/transactions code segment can have a higher level of test case development recommendation based on nature of the attributes. The test case development recommendations can also be associated with the levels of code coverage. For example, a code segment with a high level of code coverage needs higher number of test cases to improve the quality of the code and thereby is given a higher level of test case development recommendation.

Exemplary Methods

Exemplary methods for implementing prioritization of quality improvements to code are described with reference to FIGS. 1-9. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. In the context of software, the blocks represent computer instructions that, when executed by one or more processors, perform the recited operations.

Figure 10:
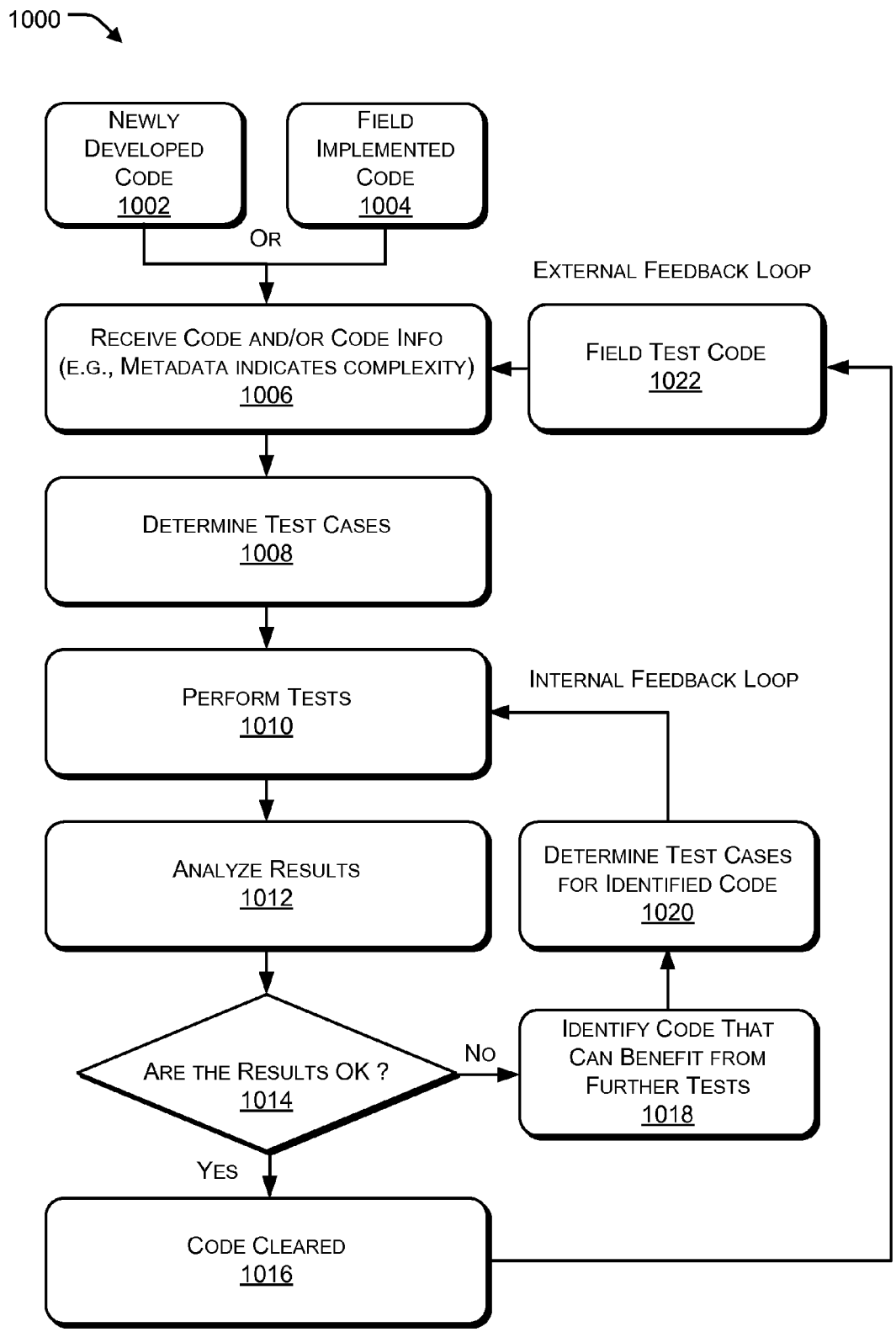
FIG. 10 illustrates exemplary method(s) for executing and analyzing test cases corresponding to the source code.

FIG. 10 illustrates an exemplary method 1000 for executing and analyzing the test cases corresponding to the source code. The method 1000 includes iterative development of test cases based on the desired level of quality. In one implementation, once the desired level of code quality is achieved, the test case development can be stopped and the test cases can be stored in the test case repository.

In the example of FIG. 10, the method 1000 includes an internal feedback loop and an external feedback loop. The external feedback loop pertains to information obtained from field testing such as beta testing whereas the internal feedback loop pertains to tests performed within the guise of a controlled testing environment with controlled tests (i.e., tests performed using proscribed test cases).

The method 1000 may be used for newly developed code 1002 or for field implemented code 1004. In general, data are available for field implemented code 1004. Such data can be used for any of a variety of purposes such as quality assessment, test case development, etc.

At block 1006, the newly developed code 1002 or the field implemented code 1004 are received. As already mentioned, code may include code information such as metadata that gives description about the structure and behavior of code such as class structure, data types of variables. The metadata can also be used to extract structural complexity measures for received code.

At block 1008, test cases are determined for the code based on the desired level of code quality required. For example, levels of code coverage are determined based on the desired level of quality and on the complexity measures for the code. The level of code coverage can indicate the priority and extent for test case development based on which the test cases are determined.

At block 1010, the determined test cases are executed for the code (i.e., tests are performed). At block 1012, execution results of the test cases are analyzed to check whether a desired level of code quality is achieved. The code coverage module 416 can also analyze the execution results to compute code coverage for the code. The code coverage can then be used in the analysis.

At block 1014, a decision occurs as to the quality of the code, for example, whether the results indicate that failures are below a desired level and that code coverage is above a proscribed level. The decision block 1014 may involve comparing the analyzed test results with the desired level of quality to determine whether additional tests should be performed.

At block 1016, if the code quality is at or above a desired level of quality, i.e. the "yes" branch from block 1014, the code is declared to have passed and no further test cases may be required. In other words, the level of code coverage is deemed acceptable. The process then proceeds via an optional external feedback loop, which includes a field testing block 1022 (e.g., beta or other field release).

At block 1018, on the other hand, if the results are not "OK" (i.e., not meeting one or more quality related criteria), i.e. the "no" branch from block 1014, then the quality assessment module 420 identifies one or more code segments that warrant further testing (e.g., test case development). The identified code segments require further testing to improve corresponding levels of code coverage to attain the desired level of quality.

At block 1020, additional test cases can be determined for the identified code segment or segments, for example, based on the desired level of quality and the complexity measures of the code. The additional test cases can then be executed at block 1010 forming an internal feedback loop that aims to improve code quality.

For the external feedback loop, test cases performed and associated test information (e.g., including complexity, etc.) can be stored in a test case repository and can be referred to at block 1006 after field testing of the code.

Figure 11:
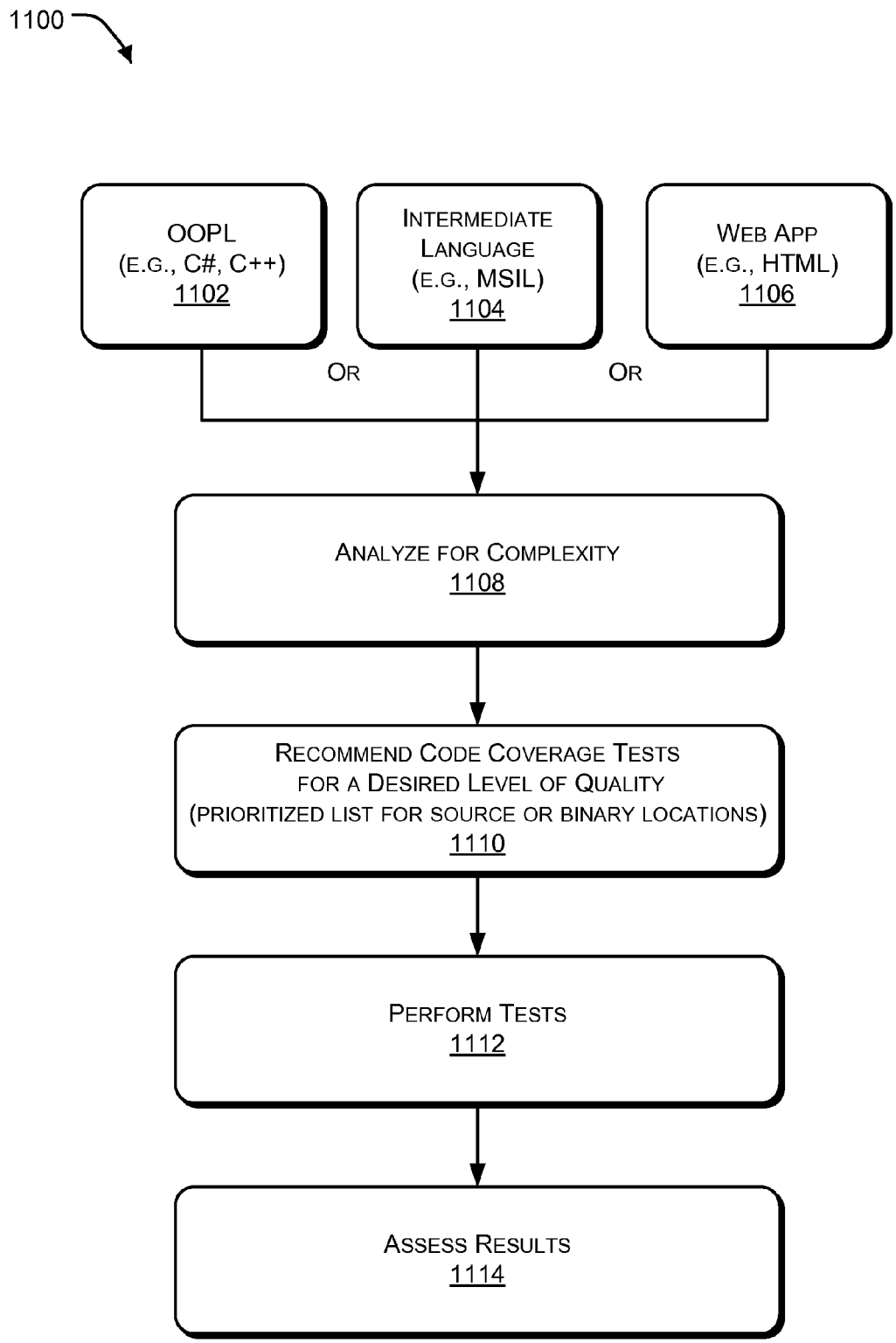
FIG. 11 illustrates exemplary method(s) for analyzing complexity and recommending code coverage tests for the source code based on the analyzed complexity.

FIG. 11 illustrates exemplary method(s) 1100 for analyzing complexity and recommending code coverage tests for the source code based on the analyzed complexity.

At block 1108, an analysis module (e.g., the quality assessment module 420) receives source code written in a programming language code 1102 (e.g., C#, C++, etc.), in an intermediate language 1104 (e.g., MSIL) or in a very elementary web application language 1106 (e.g., HTML). The analysis block 1108 analyzes the received code for complexity.

At block 1110, recommendations as to code coverage for a desired level of quality are provided. For example, given some a priori knowledge of complexity, code coverage and quality, a module may recommend code coverage levels as a function of complexity and a desired level of quality. In one implementation, the quality assessment module 420 computes the level of code coverage from a desired level of quality and the complexity measures. The quality assessment module then recommends the code coverage tests accordingly. The code coverage tests indicate the test cases required for one or more code segments of the code for attaining the desired level of quality.

At block 1112, the code coverage tests are executed for the received code. At block 1114, the executed code coverage tests are analyzed. Such an analysis may compute the code coverage of the code and estimate the quality of the code.

Overall, the method 1100 may be used as an initial step in testing code, which may be followed by one or more subsequent iterations, for example, based on the assessment of the test results per block 1114.

Figure 12:
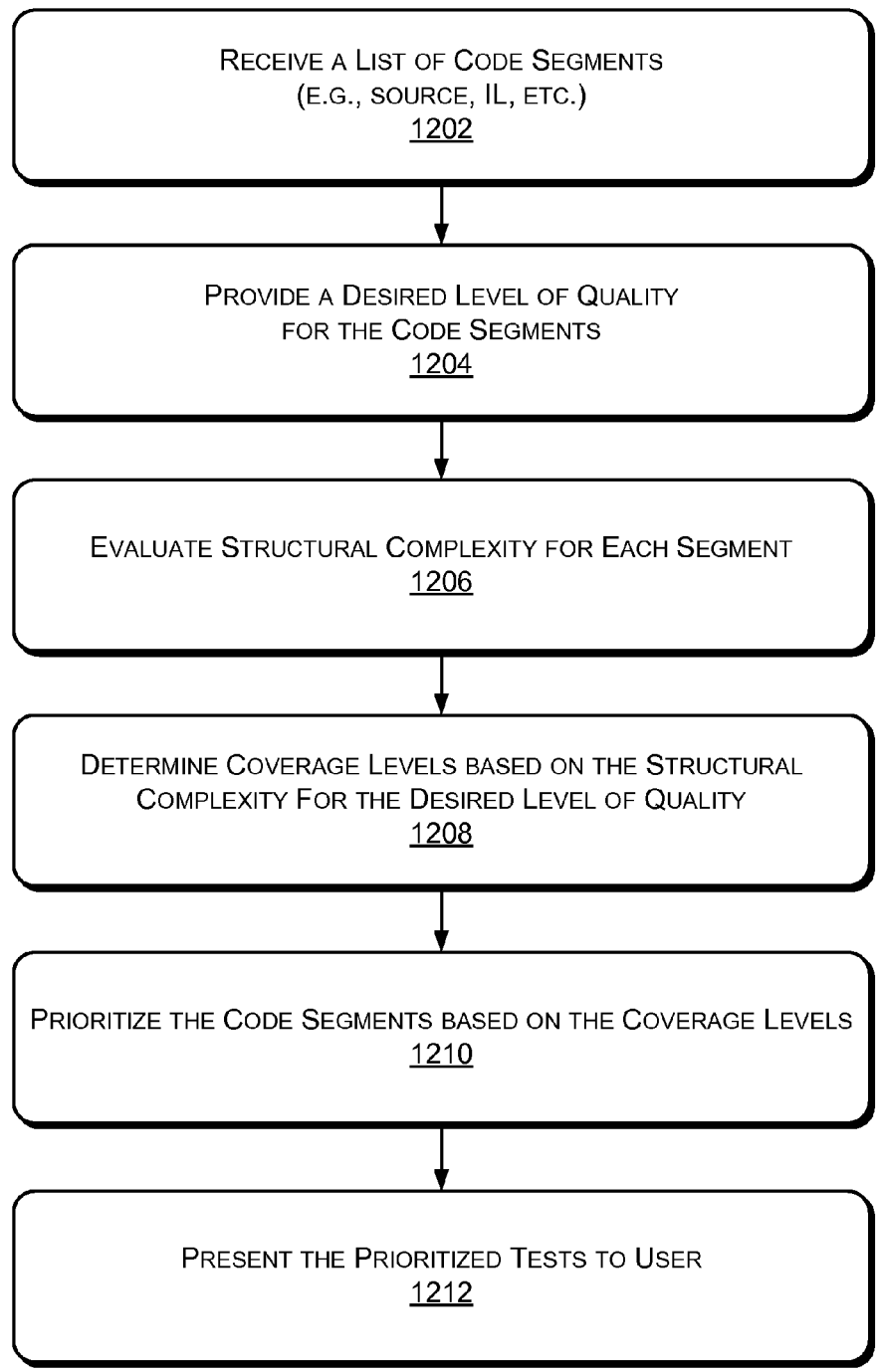
FIG. 12 illustrates exemplary method(s) for implementing prioritization of test case development

FIG. 12 illustrates exemplary method(s) 1200 for implementing prioritization of test case development.

At block 1202, a device 408 accepts a list of code segments from a particular source code. In one implementation, the list of code segments may also be from different source code files instead of being a part of the same source code file. In another implementation, the input to the device 408 can also be an IL representation of the source code such as MSIL. In yet another implementation, the device 408 can also accept one or more sections of the source code, where each section represents a set of instructions from the source code.

At block 1204, a desired level of quality for the code segments is provided, for example, by a tester. At block 1206, structural complexity of the segments are evaluated, for example, to provide complexity measures for each code segment of the source code (see, e.g., the structural complexity module 418). In one implementation, the structural complexity module 418 extracts complexity measures based on the cyclomatic complexity measure. The complexity measures, also referred to as complexity metrics, can include metrics such as coupling and depth of inheritance.

At block 1208, levels of code coverage, also referred to as coverage levels, are determined for the code segments based on the complexity measures and the desired level of quality, for example, by the quality assessment module 420.

At block 1210, the list of code segments are prioritized based at least in part on the levels of code coverage. For example, a code segment with high complexity code may have a higher required level of code coverage and thus a higher priority for test case development when compared to a code segment with a low complexity. In one implementation, the quality assessment module 420 prioritizes the test cases.

At block 1212, the prioritized list of code segments is presented to a user using graphical user interface visualizations. In one implementation, the presentation lists all methods along with corresponding levels of code coverage and corresponding structural complexity measures. Moreover, the risk levels can also be presented with each code segment. The presentation can also include an IDE view to map each code segment of the view directly to the source code of the code segment.

Figure 13:
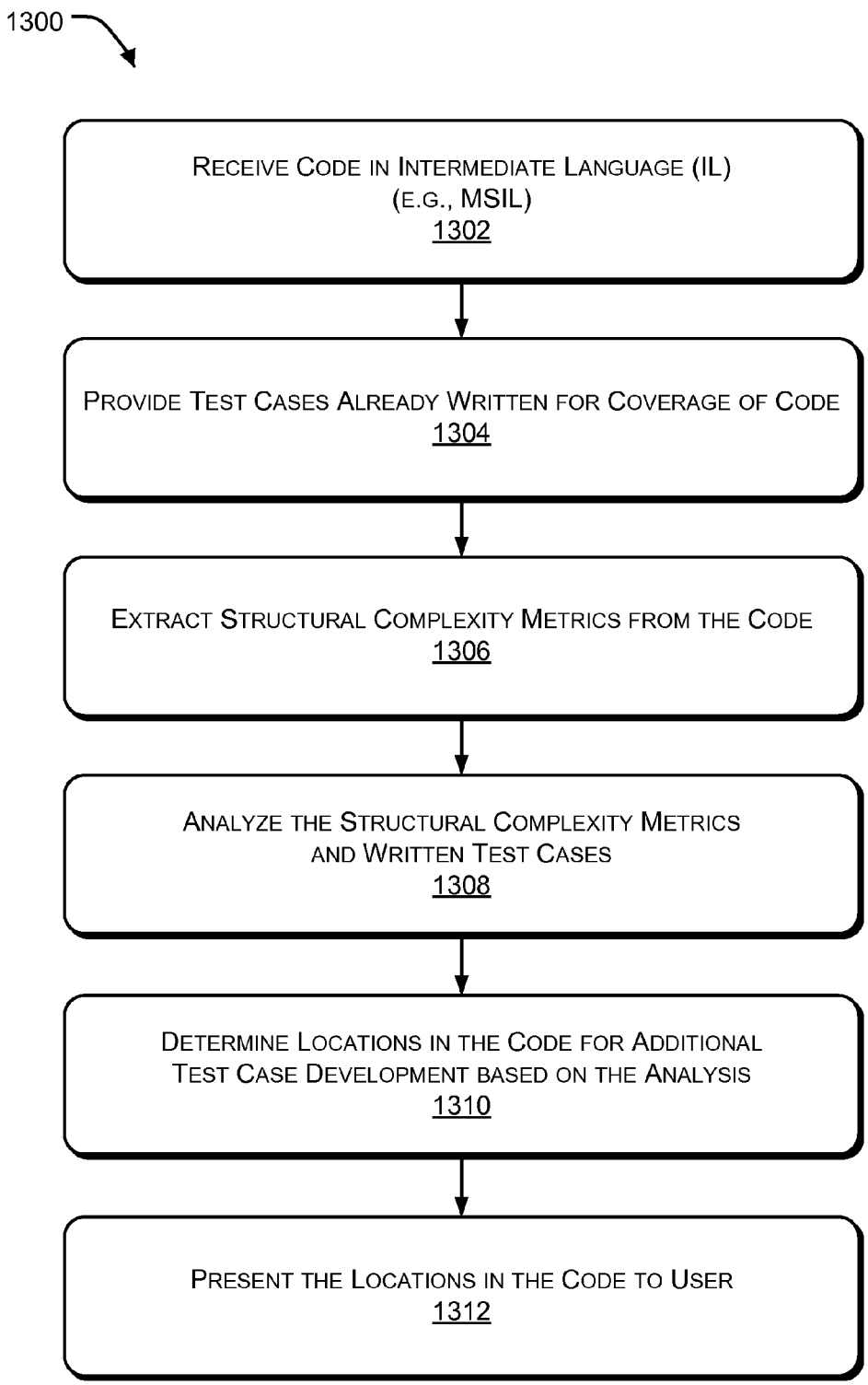
FIG. 13 illustrates exemplary method(s) for identification of locations in the source code of the software application for test case development.

FIG. 13 illustrates an exemplary method 1300 for identification of locations in the source code of the software application for test case development.

At block 1302, the device 408 accepts source code in IL representation (e.g., MSIL). In one implementation, the device 408 can accept the source code directly in any implementation language such as C#, VB, C++.

At block 1304, the device 408 provides test cases written for the code. At block 1306, the structural complexity module 418 extracts the complexity metrics, also referred to as complexity measures, based on the IL code. In one implementation, the structural complexity module 418 extracts the structural complexity metrics, such as coupling, depth of inheritance, from the IL representation of the source code. In another implementation, the structural complexity module 418 extracts the structural complexity metrics from the object code and PDB files.

At block 1308, an analysis analyzes the provided written test cases in combination with the structural complexity metrics. At block 1310, locations that warrant further test case development are identified in the IL representation based on the analysis. In one implementation, the quality assessment module 420 identifies the locations in the source code from the IL representation based on the analysis.

At block 1312, the identified locations are presented to the user. In one implementation, the quality assessment module 420 presents the identified locations to the user on a user interface.

In the example of FIG. 13, the method 1300 allows a user to identify additional test cases based on existing test cases and complexity metrics. Such a method may be performed prior to execution of any test cases or may occur after execution of one or more test cases. Where results from testing are available, such information may be used to help determine locations in the code for additional test case development.

Figure 14:
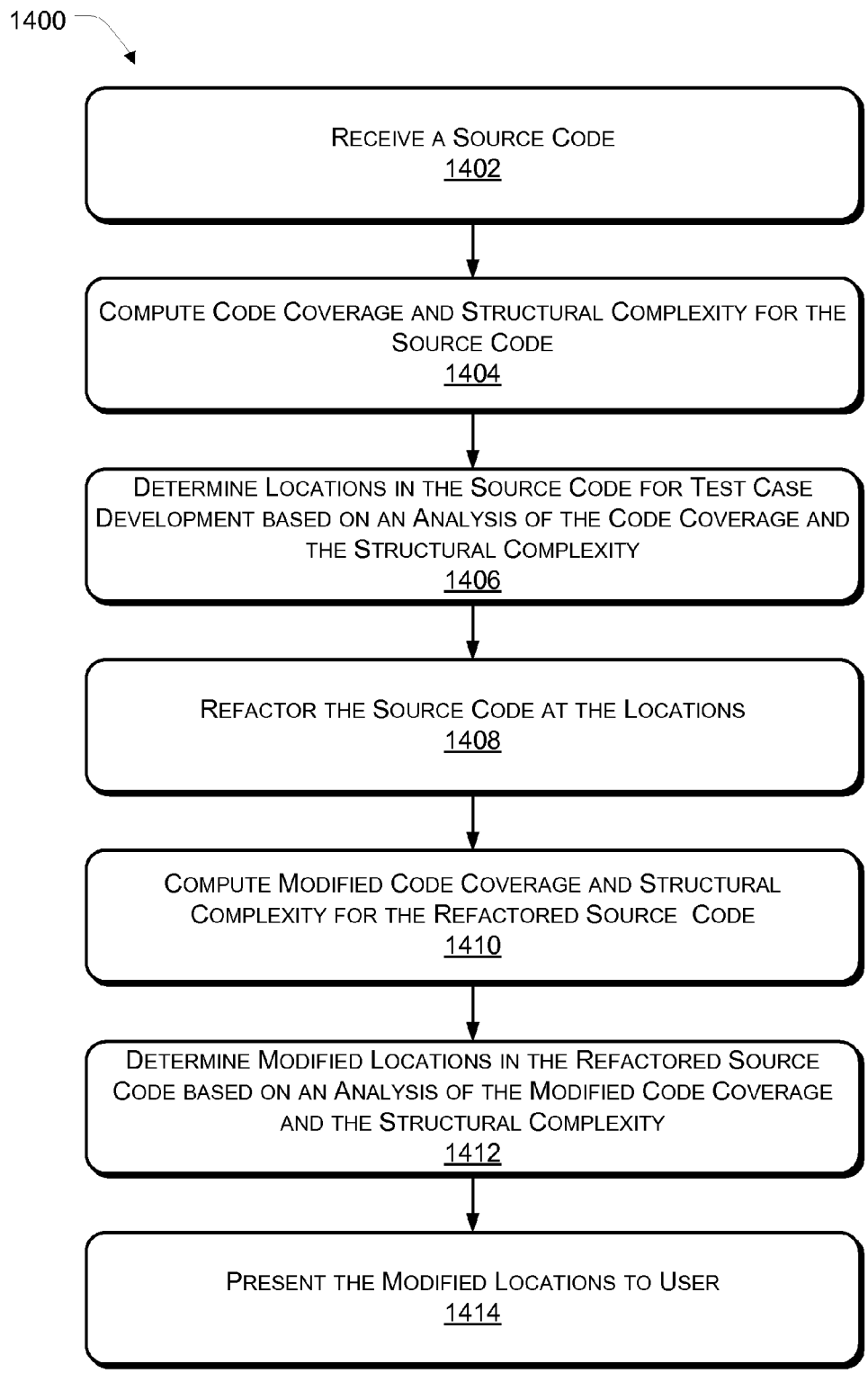
FIG. 14 illustrates exemplary method(s) to implement a feedback mechanism for recursively prioritizing quality improvements to the source code based on the changes made to the source code.

FIG. 14 illustrates an exemplary method 1400 to implement a feedback mechanism for recursively prioritizing quality improvements to source code.

At block 1402, a device (e.g., device 408-1, 408-2, 408-3) receives source code. In one implementation, the device can accept the source code in any implementation language such as C#, VB or C++. In another implementation, the device 408 can accept the source code in an IL representation. In yet another implementation, the device receives code written in a mark-up language (e.g., Extensible Markup Language (XML) or HyperText Markup Language (HTML)).

At block 1404, the device computes code coverage measures and structural complexity metrics for the source code. In one implementation, the code coverage module 416 computes the code coverage based on measures such as statement coverage, block coverage, and arc coverage. In such an implementation, the structural complexity module 418 can extract complexity metrics based on the cyclomatic complexity measure of the source code.

At block 1406, a set of locations are identified in the source code based on an analysis of the code coverage, the structural complexity metrics, and other factors such as the number of people using the source code, the frequency of usage, and the number of bugs reported. In one implementation, the quality assessment module 420 identifies the locations in the code based on sections of the code that are difficult to understand and difficult to test, and thereby warrant refactoring to make the sections simpler to understand and test (e.g., and debug).

At block 1408, the source code is refactored at the identified source code locations. The refactoring includes changing the source code based on the analysis of the code coverage, the structural complexity metrics, and other factors such as the number of people using the source code, the frequency of usage, and the number of bugs reported.

At block 1410, modified code coverage and structural complexity metrics are computed based on the refactored source code.

At block 1412, modified locations are identified in the refactored source code based on the modified code coverage measures and structural complexity metrics. For example, changes in the source code can reduce the complexity of the lines of instructions at one of the multiple identified locations. This location may then not be identified in the modified location as it may have low structural complexity metrics that may not need further test case development. However, while reducing the complexity at this location, the complexity at another location may have increased, which may then be reported as the modified location. Thus, changes in the source code can be given as a feedback to the quality assessment module 420, which can then identify the modified locations based on the feedback and the modified code coverage measures, the structural complexity metrics, and other factors such as the number of people, the usage, the frequency of usage, the number of bugs reported.

At block 1414, the modified locations are presented to the user. The user can then again change the refactored code to improve the quality of the source code.

Exemplary Computing Device

Figure 15:
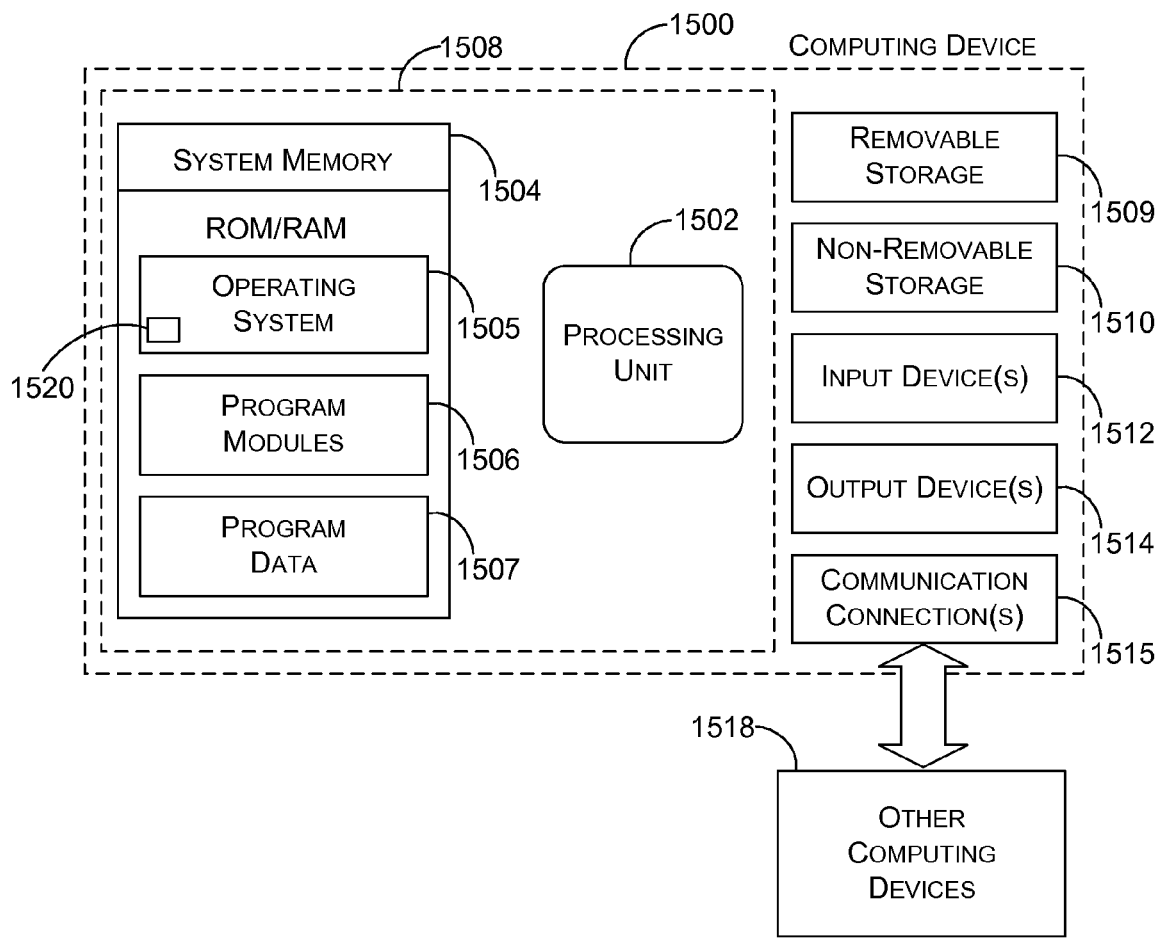
FIG. 15 illustrates an exemplary computing device capable of implementing various exemplary methods described herein.

FIG. 15 illustrates an exemplary computing device 1500 that may be used to implement various exemplary modules (or components) and in forming an exemplary system. For example, the devices of FIG. 4 may include various features of the device 1500.

In a very basic configuration, computing device 1500 typically includes at least one processing unit 1502 and system memory 1504. Depending on the exact configuration and type of computing device, system memory 1504 may be volatile (such as RAM), non-volatile (such as ROM, flash memory, etc.) or some combination of the two. System memory 1504 typically includes an operating system 1505, one or more program modules 1506, and may include program data 1507. The operating system 1505 include a component-based framework 1520 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 1500 is of a very basic configuration demarcated by a dashed line 1508. Again, a terminal may have fewer components but will interact with a computing device that may have such a basic configuration.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by removable storage 1509 and non-removable storage 1510. Computer storage media may include volatile and nonvolatile, removable and non-removable media implemented in any method or technology for storage of information, such as computer readable instructions, data structures, program modules, or other data. System memory 1504, removable storage 1509 and non-removable storage 1510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1500. Any such computer storage media may be part of device 1500. Computing device 1500 may also have input device(s) 1512 such as keyboard, mouse, pen, voice input device, touch input device, etc. Output device(s) 1514 such as a display, speakers, printer, etc. may also be included. These devices are well know in the art and need not be discussed at length here.

Computing device 1500 may also contain communication connections 1515 that allow the device to communicate with other computing devices 1518, such as over a network (e.g., consider the aforementioned network 410 of FIG. 4). Communication connections 1515 are one example of communication media. Communication media may typically be embodied by computer readable instructions, data structures, program modules, etc.

CONCLUSION

Although the invention has been described in language specific to structural features and/or methodological acts for prioritizing quality improvements to source code, it is to be understood that the invention is not necessarily limited to the specific features or acts described. Rather, the specific features and acts are disclosed as exemplary forms of implementing the invention.

What is claimed is:

1. A method, implemented at least in part by a computing device, the method comprising:
  receiving source code that comprises a plurality of code segments;
  providing threshold levels of code coverage for the plurality of code segments, wherein the threshold levels of code coverage comprise a level as a function of complexity of a respective code segment and a desired level of quality for the source code, in which the complexity of the respective code segment determines the threshold level of code coverage for the desired level of quality such that different threshold levels of code coverage are assigned to code segments of different complexity to achieve a same desired level of quality for the source code;
  providing results from test cases executed on the source code;
  identifying a code segment that does not meet its threshold level of code coverage; and
  recommending one or more additional test cases to increase a level of code coverage for the identified code segment, wherein the one or more additional test cases are recommended based at least in part on one or more complexity measures and the desired level of quality for the source code.

2. The method of claim 1 further comprising displaying a name for the code segment that does not meet its threshold level of code coverage, a complexity metric for the code segment and a current level of code coverage.

3. The method of claim 2 further comprising displaying a risk level for the code segment where the risk level corresponds to a risk of failure of the code segment during execution of the code segment.

4. The method of claim 3 further comprising calculating a quality assessment value for a code segment based on a complexity measure for the code segment divided by a level of code coverage for the code segment.

5. The method of claim 2 further comprising executing the one or more additional test cases.

6. The method of claim 5 further comprising determining whether the code segment meets its threshold level of code coverage upon execution of the one or more additional test cases.

7. A computing device comprising:
an interface to receive source code that comprises a plurality of code segments;
a processor;
a quality assessment module executable by the processor to determine a desired level of quality for the source code, wherein the quality assessment module defines a quality assessment value based at least in part on a complexity measure and a level of code coverage;
a complexity module executable by the processor to analyze the source code to assign a complexity measure to a code segment of the plurality of code segments, the plurality of code segments comprising a first code segment and a second code segment; and
a code coverage module executable by the processor to assign a level of code coverage to the code segment as a function of the desired level of quality and the complexity measure, in which the complexity measure of the code segment determines the level of code coverage for the code segment for the desired level of quality, wherein a higher level of code coverage is provided for the first code segment having a higher structural complexity than the second code segment having a lower structural complexity to achieve a same desired level of quality.

8. The computing device of claim 7 wherein the code coverage module is associated with a relationship between code quality, code complexity and code coverage.

9. The computing device of claim 8 wherein the relationship comprises a relationship based at least in part on a prior version of the source code.

10. The computing device of claim 8 wherein the relationship comprises a relationship based at least in part on results from test cases written for the source code.

11. The computing device of claim 8 wherein the relationship comprises a relationship based at least in part on results from test cases executed on the source code.

12. The computing device of claim 7 wherein the source code comprises code written in an object-oriented programming language.

13. The computing device of claim 7 wherein the source code comprises code written in an intermediate language.

14. The computing device of claim 7 wherein the source code comprises code written in a mark-up language.

15. A storage memory device including instructions executable by a processor that, when executed, performs operations comprising:
receiving a list of code segments for source code of an application;
receiving a threshold level of code coverage for one or more of the plurality of code segments, wherein the threshold level of code coverage comprises a level as a function of complexity of a respective code segment and a desired level of quality for the source code, in which the complexity of the respective code segment determines the level for the desired level of quality for the source code, wherein a higher threshold level of code coverage is provided for a code segment more complex than another code segment to achieve the desired level of quality for the source code;
receiving results from test cases executed on the source code;
identifying code segments in the list that do not meet their respective threshold levels;
recommending additional test cases to increase level of code coverage for the identified code segments; and
prioritizing the additional test cases.

16. The storage memory device of claim 15 wherein the prioritizing comprises prioritizing the additional test cases based at least in part on complexity.

17. The storage memory device of claim 15 wherein the prioritizing comprises prioritizing the additional test cases based at least in part on threshold levels.

18. The storage memory device of claim 15 wherein the prioritizing comprises prioritizing the additional test cases based at least in part on a risk of failure for the one or more of the code segments.

19. The storage memory device of claim 15 further comprising calculating a quality assessment value for a code segment in the list based at least in part on a complexity measure for the code segment divided by a level of code coverage for the code segment.

20. The storage memory device of claim 15, further comprising calculating a quality assessment value for a code segment in the list based at least in part on a complexity measure for the code segment and a level of code coverage.

* * * * *